United States Patent
Du et al.

(10) Patent No.: US 9,565,594 B2
(45) Date of Patent: Feb. 7, 2017

(54) LINK AGGREGATION IN WIRELESS LOCAL AREA NETWORKS

(71) Applicant: QUALCOMM Incorporated, San Diego, CA (US)

(72) Inventors: Shu Du, Milpitas, CA (US); Srinivasa Kumar Duvvuri, San Jose, CA (US); James Simon Cho, Mountain View, CA (US); Vipin Kumar Mehta, Los Gatos, CA (US); Guido Robert Frederiks, Aptos, CA (US); Arunkumar Jayaraman, San Jose, CA (US); Matthew Daniel Smith, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 14/229,571

(22) Filed: Mar. 28, 2014

(65) Prior Publication Data
US 2015/0282005 A1    Oct. 1, 2015

(51) Int. Cl.
*H04W 28/14*        (2009.01)
*H04W 92/10*        (2009.01)
(Continued)

(52) U.S. Cl.
CPC ............ *H04W 28/14* (2013.01); *H04L 45/245* (2013.01); *H04W 28/06* (2013.01);
(Continued)

(58) Field of Classification Search
CPC ...... H04W 28/14; H04W 84/12; H04W 92/10; H04W 28/065; H04W 28/06; H04L 45/245
See application file for complete search history.

(56) References Cited

U.S. PATENT DOCUMENTS

| 8,514,863 B2 | 8/2013 | Yi et al. |
| 2002/0181503 A1* | 12/2002 | Montgomery, Jr. .... H04J 3/085 370/468 |

(Continued)

FOREIGN PATENT DOCUMENTS

| JP | 20030355847 | 10/2003 |
| JP | 2004-350259 A | 12/2004 |

OTHER PUBLICATIONS

ISA/EPO, International Search Report and Written Opinion of the International Searching Authority, Int'l Appl. No. PCT/US2015/020895, Jun. 1, 2015, European Patent Office, Rijswijk, NL, 9 pgs.

*Primary Examiner* — Ian N Moore
*Assistant Examiner* — Justin T Van Roie
(74) *Attorney, Agent, or Firm* — Holland & Hart LLP

(57) ABSTRACT

Methods, systems, and devices are described for establishing a virtual communication link including at least a first and second physical link between two devices. A single virtual packet queue of a device may receive one or more data packets to be transmitted via the virtual communication link. The single virtual packet queue may attach a virtual sequence number to each of the one or more data packets and send the one or more data packets to one or more of the first or the second physical link according to the assigned virtual sequence numbers. The one or more packets may then be communicated via the first and/or second physical links according to link specific sequence numbers, such as medium access control (MAC) sequence numbers, assigned to the one or more data packets by the first and/or second physical links.

19 Claims, 15 Drawing Sheets

(51) Int. Cl.
  *H04W 84/12*    (2009.01)
  *H04W 28/06*    (2009.01)
  *H04L 12/709*   (2013.01)

(52) U.S. Cl.
  CPC ......... *H04W 28/065* (2013.01); *H04W 84/12* (2013.01); *H04W 92/10* (2013.01)

(56) References Cited

U.S. PATENT DOCUMENTS

| | | |
|---|---|---|
| 2006/0083233 A1 | 4/2006 | Nishibayashi et al. |
| 2009/0067358 A1* | 3/2009 | Fischer ............... H04L 12/1868 370/312 |
| 2010/0260111 A1* | 10/2010 | Sung ....................... H04L 69/14 370/328 |
| 2011/0103311 A1* | 5/2011 | Navratil ................ H04L 1/1685 370/328 |
| 2011/0134894 A1 | 6/2011 | Stacey |
| 2011/0205996 A1* | 8/2011 | Kim ...................... H04L 1/1812 370/329 |
| 2011/0286322 A1 | 11/2011 | Abraham et al. |
| 2012/0014335 A1 | 1/2012 | Adachi et al. |
| 2012/0188873 A1 | 7/2012 | Nakatsugawa |
| 2014/0029527 A1 | 1/2014 | Okuda |
| 2014/0092828 A1* | 4/2014 | Sirotkin .............. H04W 76/046 370/329 |

\* cited by examiner

LINK AGGREGATION IN WIRELESS LOCAL AREA NETWORKS

BACKGROUND

The following relates to wireless communications, and in particular to techniques for aggregating communication links between devices. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point). The STA may communicate with the AP or other devices via one or more channels or links, such as over a 2.4 GHz and/or a 5 GHz link.

When a mobile device is in close proximity to an AP, such as in the space of a home, it may communicate with the AP via a first channel, such as a 5 GHz channel. When the mobile moves farther away from the AP, it may be beneficial for the mobile station to communicate over a different channel, such as a 2.4 GHz channel, to provide better resilience to obstructions in the communication path, for example. In some techniques these channels can be aggregated to provide better throughput, reliability, etc.

However, current link aggregation techniques have drawbacks and reduced performance in certain scenarios. Some techniques, for example, may introduce delay in the process of splitting and assigning data packets to different sessions over different links. Furthermore, once data packets associated with different sessions are split over different links, the data packets may not be re-allocated to other links to account for failed reception, decreased link throughput or delay, and the like. These techniques generally require a group or package of data to be re-sent, and often times introduce delay between the time when a communication failure occurs, when the failure is detected, and when the data is re-transmitted. For example, where transmission control protocol (TCP) traffic is being carried over a link that fails, re-routing of the data may only occur at the TCP level, which may cause substantial delay before data is re-sent over the other link. As a result, there is a need to improve link aggregation techniques in WLANs, such as Wi-Fi networks.

SUMMARY

The described features generally relate to one or more improved systems, methods, and/or apparatuses for combining multiple physical links into one virtual communication link to provide adaptive seamless routing and communication of data packets over the multiple physical links. A virtual communication link may be established that includes at least a first and a second physical link. Packets to be communicated over the virtual communication link may be received at a single virtual packet queue where virtual sequence numbers (VSNs) may be attached to the packets. The packets may then be sent to at least one of a first physical link or a second physical link according to the VSN of the packets, where link specific sequence numbers, for example medium access control (MAC) sequence numbers, may be assigned to each of the packets. The packets may be for communication via the at least one of the first physical link and the second physical link according to the link specific sequence numbers assigned to each of the data packet by the at least one of the first physical link and the second physical link. In some embodiments, the packets may then be communicated by the first and/or second physical links according to the link specific sequence numbers. In some embodiments, the single virtual packet queue may receive at least one packet back from the first or second physical links if transmission of the at least one packet failed. At least one of the failed packets may then be re-sent over the other of the first or second physical link according to the VSNs assigned to the at least one packet. In this way, packets may be received and re-ordered according to the VSN of the packets irrespective of link failures or conditions that may cause the link specific sequence numbers of the packets to change or become out of order.

In some embodiments, establishing the virtual communication link includes communicating at least one vendor specific information element (IE) in an independent action frame. The independent action frame may include an add block acknowledgment (ADDBA) frame or a delete block acknowledgment (DELBA) frame. In some embodiments, the at least one vendor specific IE may include at least one link aggregation request parameter, at least one link aggregation response parameter, or a combination thereof. The link aggregation request parameter may include at least one of a number of auxiliary links, a virtual sequence number starting sequence number, a buffer size, a requesting device's MAC address of a physical link, a channel number of the physical link, a bandwidth of the physical link, a number of chains of the physical link, or a combination thereof. The link aggregation response parameter may include at least one of a plurality of result codes, a receiver reordering buffer size, a responding device's MAC address of the physical link, a bandwidth supported by the responding device, a number of chains in the physical link supported by the responding device, or a combination thereof.

In some embodiments, communicating the one or more data packets via the virtual communication link is performed in a single communication session. In some cases, the first physical link includes a 2.4 GHz band link and the second physical link includes a 5 GHz band link. In some embodiments, the at least one data packet may include at least one MAC service data unit (MSDU).

In some embodiments, the virtual communication link may be re-configured to include a third physical link. In addition, communicating the at least one data packet via the re-configured virtual communication link may be performed with the virtual sequence numbers already assigned to the at least one data packet.

In some embodiments, the virtual communication link may be re-configured by communicating at least one vendor specific reconfiguration IE in an independent action frame, attaching an auxiliary request parameter to a data packet of the at least one data packet communicated over the virtual communication link, or both.

In other embodiments, a wireless communications device may include a virtual communication link manager to establish a virtual communication link including a first physical link and a second physical link different from the first physical link. The wireless communications device may also include a virtual packet queue to receive at least one data packet for the virtual communication link, attach a virtual sequence number to each of the at least one data packet, and send the at least one data packet to at least one of the first physical link and the second physical link according to the attached virtual sequence numbers. The virtual communication link manager may also be configured to communicate the at least one data packet via the one or more of the first physical link or the second physical link according to MAC sequence numbers assigned to the at least one data packet by the at least one of the first physical link and the second physical link.

In some embodiments, the virtual packet queue may be configured to receive a data packet of the at least one data packet back from the at least one of the first physical link and the second physical link based on a transmission failure for the data packet over the at least one of the first physical link and the second physical link. The virtual packet queue may also be configured to re-send the data packet received back from the at least one of the first physical link and the second physical link via the other of the first physical link and the second physical link according to the attached virtual sequence number(s) of the data packet.

In some embodiments, the virtual communication link manager to may be configured to communicate at least one vendor specific information element (IE) in an independent action frame. In some embodiments, the at least one vendor specific IE may include one or more link aggregation request parameters, one or more link aggregation response parameters, or a combination thereof. The link aggregation request parameter may include at least one of a number of auxiliary links, a virtual sequence number starting sequence number, a buffer size, a requesting device's MAC address of a physical link, a channel number of the physical link, a bandwidth of the physical link, and a number of chains of the physical link. The link aggregation response parameter may include at least one of a plurality of result codes, a receiver reordering buffer size, a responding device's MAC address of the physical link, a bandwidth supported by the responding device, and a number of chains in the physical link supported by the responding device.

In some embodiments, the virtual communication link manager may be configured to communicate the at least one data packet via the virtual communication link in a single communication session.

In some embodiments, the virtual communication link manager may be configured to re-configure the virtual communication link to include a third physical link, and communicate the at least one data packet via the re-configured virtual communication link using the virtual sequence numbers already assigned to the at least one data packet.

In some embodiments, the virtual communication link manager may be configured to re-configure the virtual communication link by communicating at least one vendor specific reconfiguration information element (IE) in an independent action frame, attaching an auxiliary request parameter to a data packet of the at least one data packet communicated over the virtual communication link, or a combination thereof.

In other embodiments, a wireless communication device may include means for establishing a virtual communication link including a first physical link and a second physical link different from the first physical link, means for receiving at least one data packet at a single virtual packet queue for the virtual communication link, and means for attaching a virtual sequence number to each of the at least one data packet in the virtual packet queue. The wireless communication device may also include means for sending, from the virtual packet queue, the at least one data packet to at least one of the first physical link and the second physical link according to the attached virtual sequence numbers, and means for communicating the at least one data packet via the at least one of the first physical link and the second physical link according to MAC sequence numbers assigned to the at least one data packet by the at least one of the first physical link and the second physical link.

In some embodiments, the wireless communication device may include means for receiving, at the virtual packet queue, a data packet of the at least one data packet back from the at least one of the first physical link and the second physical link based on a transmission failure for the data packet over the at least one of the first physical link and the second physical link. The wireless communication device may also include means for re-sending the data packet received back from the at least one of the first physical link and the second physical link via the other of the first physical link and the second physical link according to the attached virtual sequence numbers of the data packet.

In some embodiments, the means for establishing the virtual communication link may include means for communicating at least one vendor specific IE in an independent action frame. In some embodiments, the at least one vendor specific IE may at least one link aggregation request parameter, at least one link aggregation response parameter, or a combination thereof. The link aggregation request parameter may include at least one of a number of auxiliary links, a virtual sequence number starting sequence number, a buffer size, a requesting device's MAC address of a physical link, a channel number of the physical link, a bandwidth of the physical link, a number of chains of the physical link, or a combination thereof. The link aggregation response parameter may include at least one of a plurality of result codes, a receiver reordering buffer size, a responding device's MAC address of the physical link, a bandwidth supported by the responding device, a number of chains in the physical link supported by the responding device, or a combination thereof.

In some embodiments, the means for communicating the one or more data packets via the virtual communication link may enable the wireless communication device to communicate the at least one data packet in a single communication session.

In some embodiments, the wireless communication device may include means for re-configuring the virtual communication link to include a third physical link, with the means for communicating the at least one data packet configured to communicate the at least one data packet via the re-configured virtual communication link using the virtual sequence numbers already assigned to the at least one data packet.

In some embodiments, the wireless communication device may include means for re-configuring the virtual communication link by at least one of communicating at least one vendor specific reconfiguration information element (IE) in an independent action frame, and attaching an auxiliary request parameter to a data packet of the at least one data packet communicated over the virtual communication link.

In other embodiments, a computer program product operable on a wireless communication device may include a non-transitory computer-readable medium storing instructions for establishing a virtual communication link including a first physical link and a second physical link different from the first physical link. The non-transitory computer-readable medium may also store instructions for receiving at least one data packet at a single virtual packet queue for the virtual communication link, attaching a virtual sequence number to each of the at least one data packet in the virtual packet queue, sending, from the virtual packet queue, the at least one data packet to at least one of the first physical link and the second physical link according to the attached virtual sequence numbers, and communicating the at least one data packet via the at least one of the first physical link and the second physical link according to MAC sequence numbers assigned to the at least one data packet by the at least one of the first physical link and the second physical link.

In some embodiments, the non-transitory computer-readable medium may store instructions for receiving, at the virtual packet queue, a data packet of the at least one data packet back from the at least one of the first physical link and the second physical link based on a transmission failure for the data packet over the at least one of the first physical link and the second physical link. The non-transitory computer-readable medium may also stores instructions for re-sending the data packet received back from the at least one of the first physical link and the second physical link via the other of the first physical link and the second physical link according to the attached virtual sequence numbers of the data packet.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
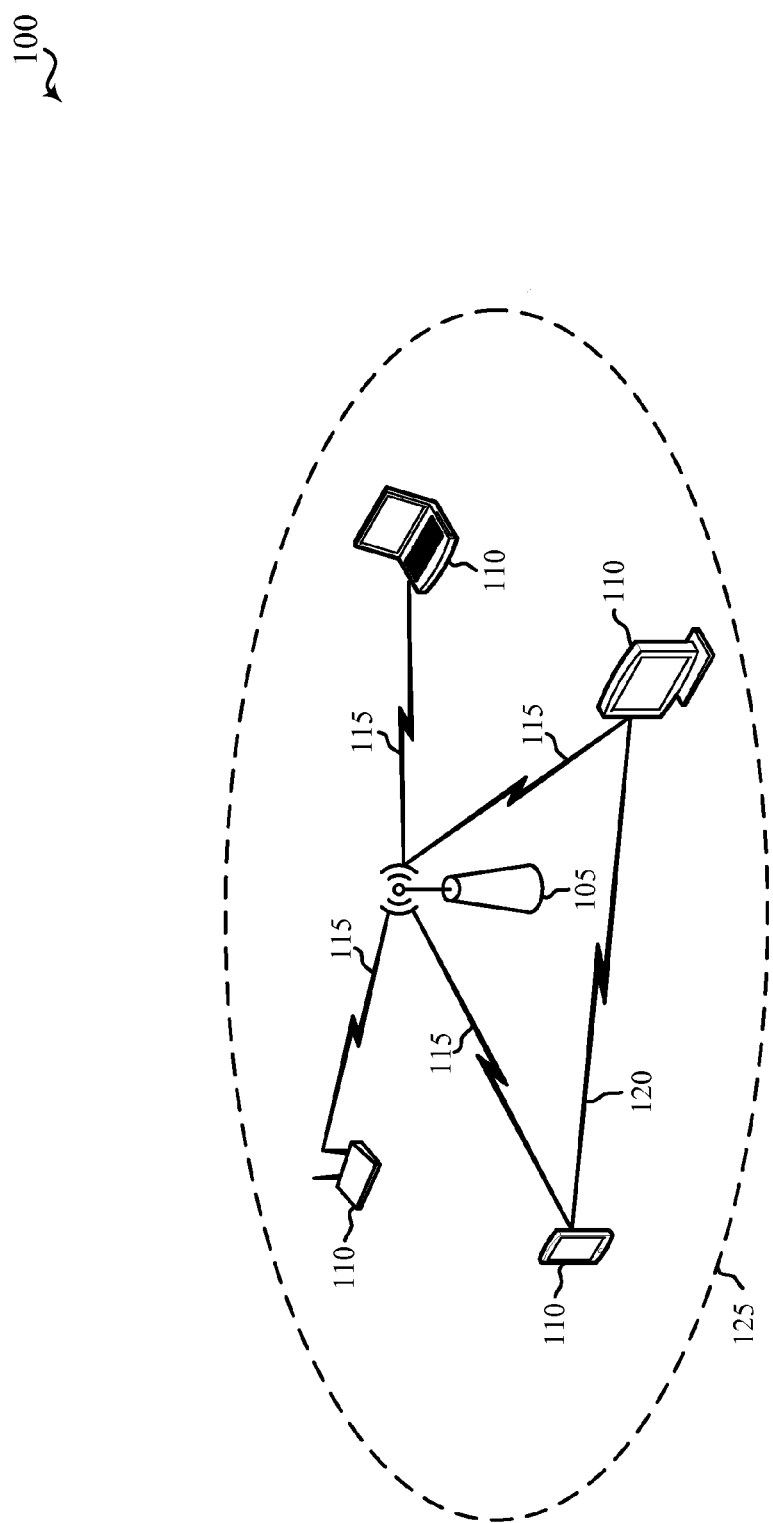
FIG. 1 shows a block diagram of a wireless communications system in accordance with various embodiments.

The described features generally relate to one or more improved systems, methods, and/or apparatuses for combining multiple physical links into one virtual communication link to provide adaptive seamless routing and communication of data packets over the multiple physical links. A virtual communication link may be established that includes at least a first and a second physical link, for example a 2.4 GHz link and a 5 GHz link. The virtual communication link may receive packets for transmission at a single virtual packet queue where virtual sequence numbers (VSNs) may be attached to the packets. The virtual communication link may attach VSNs to medium access control (MAC) service data units (MSDUs), or alternatively MAC protocol data service units (MPDUs) (e.g., a MSDU with layer-specific protocol information). The VSN may be included in a tag length value (TLV) field of each packet and may indicate a transmission order of the packet, such that the packets may be transmitted and received in the same order, particularly when the data units are transmitted over multiple physical links, and potentially out of order. In some embodiments, the virtual packet queue may be implemented in software, hardware, or a combination of both.

The packets may be sent to at least one of a first physical link or a second physical link according to the VSN of each of the packets, where independent link specific sequence numbers (e.g. MAC sequence numbers) may be assigned to the packets by each of the physical links. The link specific sequence numbers may indicate an order of packets to be transmitted by a physical link, such as a first or second physical link, and may be used by the receiving device to reorder packets in the event that the packets are not received in the same order. In some cases, the link specific sequence numbers may include MAC sequence numbers. The packets may then be transmitted and/or retransmitted using automatic repeat request (ARQ) or hybrid ARQ (HARQ) techniques independently by the first and/or second physical links according to the MAC sequence numbers. In some cases, multiple packets, such as multiple MSDUs or MPDUs, may be aggregated by MAC hardware of the first and/or second physical links into one or more A-MSDUs or A-MPDUs respectively, and then transmitted. As the VSNs of the packets are independent of the link specific sequence numbers assigned by physical link hardware, the order of the packets may be maintained independently of changes in physical link conditions or physical link failures.

In some embodiments, the virtual communication link may be initialized in a single communication session via the exchange of Vendor Specific information elements (IEs), for example, between a link requesting device and a link responding device over a primary communication link. The Vendor Specific IEs, which may be transmitted in an independent action frame, may include link aggregation parameters to establish the one or more auxiliary links. Once the one or more auxiliary links are confirmed, packets may be communicated between the requesting and responding device over the primary and auxiliary link(s) according the VSNs attached to the packets.

In some embodiments, the single virtual packet queue may receive one or more packets back from the first or second physical links if ARQ/HARQ transmission of the one or more packets failed. These packets may then be re-sent over the other of the first or second physical link according to the VSNs assigned to the one or more packets. In this way, packets may be received and re-ordered according to the VSN of the packets irrespective of link failures or conditions that may cause the MAC sequence numbers of the packets to become out of order.

In some embodiments, the virtual communication session may be re-configured by either device by sending another request in a frame with the Vendor Specific IE to define the new auxiliary link parameters or by attaching the new link parameters onto the end of an MSDU, for example in a new TLV. When the reconfiguration is confirmed, the requesting device can stop using the current auxiliary link for any further data transmission, initialize the new link, and communicate packets over the new link without having to re-assign or re-attach new VSNs to the packets.

When link aggregation is enabled, packets can be transmitted or retransmitted through any enabled links. Because of this, dispatching multiple packets becomes relatively easy. Whenever a link has extra bandwidth, it can request new packets from the dispatching modules. By doing this, the dispatching ratio across links should be automatically adapted to the capacities of the links. To reduce the latency and maximize the aggregation, the dispatching modules may proactively push the packets into the links based on the past observation of the link capacities (e.g., how fast packets are drained at each link).

The following description provides examples, and is not limiting of the scope, applicability, or configuration set forth in the claims. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. As referred to herein, a WLAN connection or link may be synonymous with a Wi-Fi, Wi-Fi Direct, P2P connection or group, Wi-Fi Display, Miracast, or other WLAN communication technologies. For the purposes of explanation, the described methods, systems, and devices refer specifically to WLAN; however, other radio communication or access technologies may be compatible with and implemented using the described techniques.

Referring first to FIG. 1, a block diagram illustrates an example of a WLAN or Wi-Fi network 100 such as, e.g., a network implementing at least one of the IEEE 802.11 family of standards. The network 100 may include an access point (AP) 105 and one or more wireless devices or stations (STAs) 110, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the network 100 may have multiple APs 105. Each of the wireless devices 110, which may also be referred to as a wireless station, a mobile station (MS), a mobile device, an access terminal (AT), a user equipment (UE), a subscriber station (SS), or a subscriber unit, may associate and communicate with an AP 105 via a communication link 115. Each AP 105 has a coverage area 125 such that stations 110 within that area can typically communicate with the AP 105. The devices 110 may be dispersed throughout the coverage area 125. Each device 110 may be stationary or mobile.

Although not shown in FIG. 1, a station 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A coverage area 125 for an access point 105 may be divided into sectors making up only a portion of the coverage area (not shown). The system 100 may include access points 105 of different types (e.g., metropolitan area, home network, etc.), with varying sizes of coverage areas and overlapping coverage areas for different technologies. Although not shown, other wireless devices can communicate with the AP 105.

While the devices 110 may communicate with each other through the AP 105 using AP links 115, each device 110 may also communicate directly with one or more other devices 110 via a direct wireless link 120. Two or more devices 110 may communicate via a direct wireless link 120 when both devices 110 are in the AP coverage area 125 or when one or neither device 110 is within the AP coverage area 125 (not shown). Examples of direct wireless links 120 may include Wi-Fi Direct connections, connections established by using a Wi-Fi Tunneled Direct Link Setup (TDLS) link, and other P2P group connections. The Wi-Fi devices 110, 105 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented in system 100.

In various embodiments, a device 110 may be connected to a another device 110 via a Wi-Fi Display connection. Wi-Fi Display, which may be known as Miracast, allows one device 110, such as a portable device or computer, to transmit video and audio to a compatible display, such as another device 110, wirelessly. It enables delivery of compressed standard or high-definition video over a direct wireless link (e.g., peer-to-peer link 120), or an indirect wireless link (e.g., via AP link 115).

Miracast allows users to echo the display from a first device 110 onto the display of another device 110 by video and/or audio content streaming. In some implementations, the link 120 between the two devices 110 may be bi-directional. In one configuration, the connection between the two devices 110 may also allow users to launch applications stored on a first device 110 via a second device 110. For example, the second device 110 may include various input controls (e.g., mouse, keyboard, knobs, keys, user interface buttons). These controls may be used at the second device 110 to initialize and interact with applications stored on the first device 110.

In some cases, it may be beneficial for a device 110 to communicate with the AP 105 or another device 120 over multiple carriers or links, which may be represented by links 115, 120. A device 110 may have high throughput requirements, for example, to meet the requirements of a particular application (e.g., streaming video, etc.) or to improve performance of an application. In these and other cases, the device 110 may establish a virtual communication link, which may include two or more different physical communication links, with an AP 105 or another device 110. Device 110 may establish the virtual communication link by sending a vendor specific IE in an independent action frame over a primary communication link, such as link 115, to an AP 105 or to another device 110 via link 120. The AP 105 or other device 110 may respond with its own vendor specific IE over the primary link to confirm the establishment of one or more auxiliary links Once the one or more auxiliary links are confirmed, packets may be communicated between device 110 and the AP 105 or other device 110 over the primary and auxiliary link(s), which may be represented by link(s) 115.

Packets, such as MSDUs, to be transmitted to an AP 105 or another device 110 may be received at a single virtual packet queue of device 110 where VSNs may be attached to each of the packets. The VSNs may indicate an order of packets to be transmitted, and may be contained in a TLV field of each packet. The packets with VSNs may then be sent to the primary and auxiliary physical link hardware where each physical link may assign link specific sequence numbers (e.g., MAC sequence numbers) to the packets. The physical links may then transmit the packets according to the MAC sequence numbers to an AP 105 via links 115 or to another device 110 via links 120. The AP 105 or another device 110 may receive the packets over the two or more physical links 115, 120 and re-order the packets according to the VSNs. In some cases, the AP 105 may initiate and establish virtual communication links in a similar manner.

In this way, packets can be received and re-ordered independently of the conditions of the physical links 115, 120. For example, link failures or changes in channel conditions may affect the throughput of each link 115 and cause packets over a first physical link 115 to arrive more quickly than packets across the other physical link 115. In some cases, the MAC sequence numbers of the packets may become out of order over one or more of the physical links 115 due to poor channel or link conditions. In any of these scenarios, re-ordering of the packets based on the MAC sequence numbers may be ineffective and produce delays in waiting for packets to arrive in the correct order, waiting for channel conditions to improve etc. By instead re-ordering the packets at the receiving device, which may be either an AP 105 or another device 110, according to the VSNs, delays caused by changes in physical link conditions and/or failures may be reduced or eliminated. By combining at least two links 115 into a virtual communication link, the device may realize a combined peak throughput of both links 115.

Figure 2:
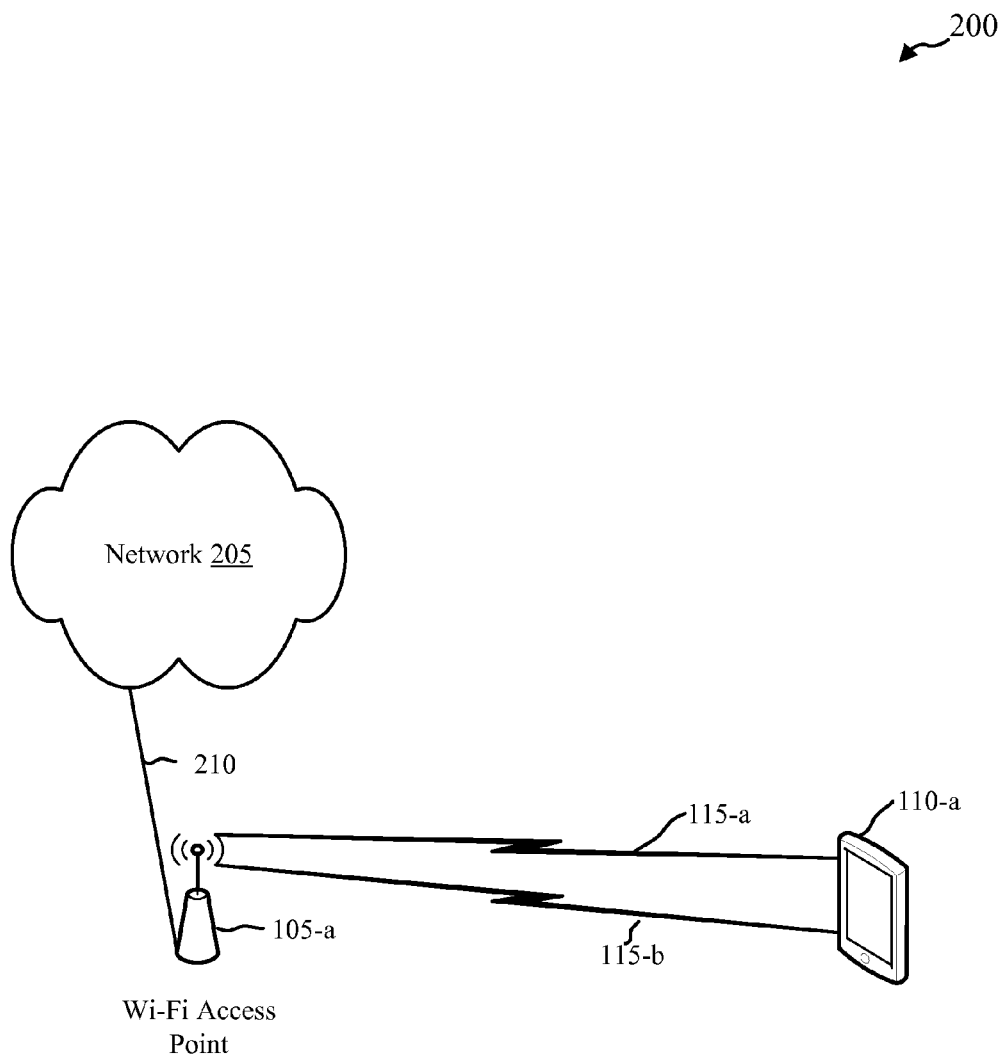
FIG. 2 shows a block diagram of an example of wireless communications between an AP and an STA in accordance with various embodiments.

Referring now to FIG. 2, a block diagram 200 illustrates an example of wireless communications between an AP 105-a and a device or STA 110-a in accordance with various embodiments. The STA 110-a and the AP 105-a may be examples of device 110 and AP 105 described in reference to FIG. 1. The AP 105-a may be in communication with a network 205 via link 210, which may be either a wired or wireless link. The AP 105-a may also communicate with an STA 110-a over a primary link 115-a. The primary link 115-a at times may, however, not yield enough throughput for certain communications between the STA 110-a and the AP 105-a, such as streaming video or transferring large files, certain applications operating on the STA 110-a or AP 105-a, and the like. In these cases, it may be beneficial for either the STA 110-a or the AP 105-a to initiate and establish a virtual communication link to, for example, increase throughput of communications between the AP 105-a and the STA 110-a.

Establishment of the virtual communication link will be described below from the perspective of the STA 110-a. However, it should be understood that the AP 105-a may also initiate and establish a virtual communication link with the STA 110-a in a similar manner.

The STA 110-a may establish the virtual communication link by sending link aggregation information to the AP 105-a, for example in an independent action frame over the primary link 115-a. The link aggregation information may include parameters, such as a number of auxiliary links, a virtual sequence number (VSN) starting sequence number, a buffer size, the MAC address for the physical link 115-b of the requesting device 110-a, a channel number of the physical link 115-b, a bandwidth of the physical link 115-b, and/or a number of chains of the physical link 115-b. The AP 105-a may respond and provide similar information to initialize one or more auxiliary links 115-b to be included in the virtual communication link. The STA 110-a may setup a generic block acknowledgement (BA) session using the same terminal identification (TID) used on the primary link 115-a on the auxiliary link 115-b. After a BA session is setup on the auxiliary link 115-b, the virtual communication link may be fully active.

Figure 3:
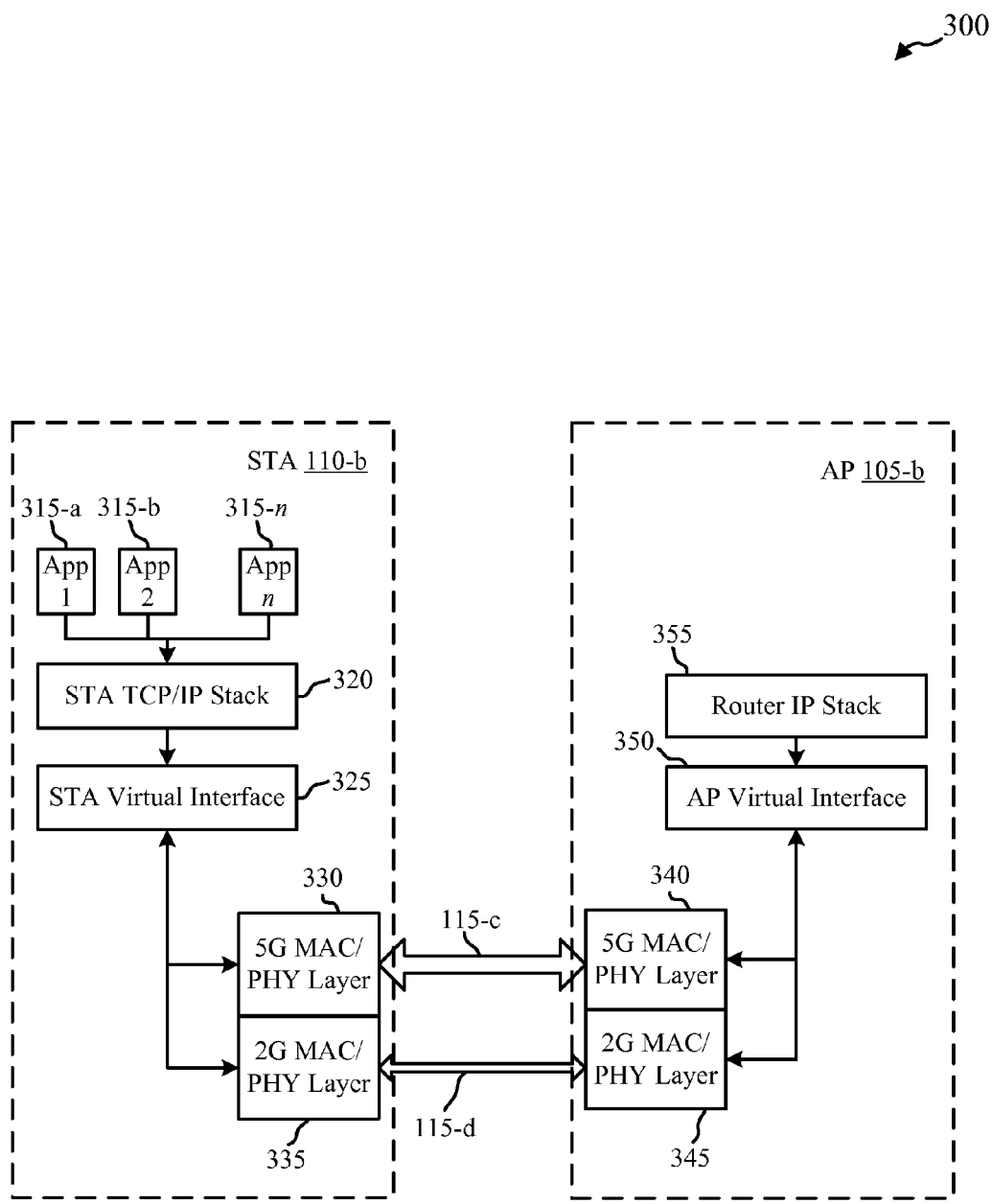
FIG. 3 shows a block diagram of an STA and an AP in communication with one another via two physical links in accordance with various embodiments.

Referring next to FIG. 3, an STA 110-b may establish and communicate with an AP 105-b over two physical links 115-c and 115-d, for example by establishing a virtual communication link including the two links 115-c, 115-d. The STA 110-b and the AP 105-b may be examples of devices 110 and APs 105 described above in reference to FIGS. 1 and/or 2. The STA 110-b through one or more applications 315-a through 315-n may have data to send/request from the AP 105-b. Data to be sent may be passed down from the one or more applications 315-a through 315-n to an STA TCP/IP stack 320, where the data may be processed and formatted into packets to be transmitted to the AP 105-b. The packets may then be communicated to an STA virtual interface 325. The STA virtual interface 325 may direct packets received from the STA TCP/IP stack 320 to one or more of links 115-c, 115-d by passing the packets to either or both of the 5 GHz or 2.4 GHz MAC/PHY layers 330, 335. In some embodiments, the 2.4 GHz link 115-d may be the primary link and the 5 GHz link 115-c may be the secondary link. In other embodiments, the priority of the links may be reversed.

Typically, forward error-correcting (FEC) coding and ARQ/HARQ functions may be performed in hardware by the MAC layers of MAC/PHY layers 330, 335. For example, MAC/PHY layers 330, 335 may add redundant bits such as cyclic redundancy check (CRC) information and may re-transmit packets when the packets are corrupted when received at MAC/PHY layers 340, 345. Each packet received by the MAC/PHY layers 330, 335 may be put into a transmitter MAC hardware queue and assigned a MAC sequence number for re-ordering the packets at the receiver MAC hardware queue. Packets may then be transmitted and/or retransmitted over the PHY layers as needed and passed on to higher layers after successful decoding in order of the MAC sequence numbers. HARQ is a combination of FEC and ARQ and may include transmission of a subset of systematic and parity bits from FEC encoding (e.g., turbo coding, convolutional coding, etc.) of a data block in a first transmission. If the first transmission is corrupt at the receiver, retransmissions may include a different set of systematic bits and/or parity bits than the original transmission.

In some cases, components of the MAC/PHY layers 330, 335, 340, and 345 including the MAC queues may be implemented in hardware. For example, the MAC/PHY layers 330, 335, 340, and 345 may be implanted as a combination of application specific integrated circuits (ASICs), custom digital logic, and application specific or custom analog integrated or discrete circuit elements. Implementing these functions in hardware may realize performance gains, faster processing, accommodate hardware acceleration, etc. For example, MAC/PHY layers 330, 335, 340, and 345 may perform high data rate real-time processing that may be more suitable to hardware implementation. For these reasons, it may be more beneficial to have the MAC queues implemented in hardware rather than in software. However, in some cases where it is not practical to have separate hardware MAC queues, benefits of the present disclosure may still be realized with the use of MAC queues implemented in software.

In some embodiments, applications 315 of STA 110-b may be associated with particular TCP or user datagram protocol (UDP) sessions. The STA virtual interface 325 may associate TCP or UDP sessions to be transmitted over the virtual link with one of the physical links 115-c, 115-d. Each of the links 115-c, 115-d may be dedicated to a particular TCP or UDP session, or may carry multiple TCP and/or UDP sessions, in some examples. The STA virtual interface 325 may then direct packets of the TCP or UDP session to the transceiver 330, 335 of the link associated with the particular session. If a particular link 115-c or 115-d fails, the STA virtual interface 325 may re-direct TCP or UDP sessions carried by the failing link to a different one of the links 115-c, 115-d. These examples may be referred to as session based virtual interfaces.

In other embodiments, the STA virtual interface 325 may implement packet level switching of packets received from the STA TCP/IP stack 320. In this implementation, the STA virtual interface 325 may assign a VSN to each of the packets to indicate a transmission order of each of the packets. The STA virtual interface 325 may then direct each packet to a particular transceiver 330, 335 to be transmitted to the AP 105-b over one or more of links 115-c, 115-d. The VSNs of the packets may be independent of hardware sequence numbers attached to the packets, for example at the MAC/PHY layers 330, 335, and as a result, may allow for more adaptive transmission of the packets over two or more links 115-c, 115-d.

In either embodiment, the AP 105-b may receive the packets transmitted over links 115-c and 115-d at the MAC/PHY layers 340, 345. The received packets may then be passed up to the AP virtual interface 350, where the packets may be reordered and sent up to one or more applications or programs of the AP 105-b. The AP virtual interface 350 may re-order or reorganize the packets based on TCP or UDP session, or using the VSNs attached to packets. Before passing the reordered packets up to an application or program of the AP 105-b, the AP virtual interface 350 may remove the VSNs from the packets.

In some embodiments, if ARQ/HARQ transmission/reception of one or more packets fails (e.g., ARQ/HARQ timeout, etc.), the packets may be received back at the virtual interface 325, 350 of device 110-b and/or AP 105-b from a MAC/PHY layer element 330, 335 or 340, 345. For session-level switching, the STA virtual interfaces 325,350 may re-assign the session associated with the packets to the other link. In packet-level switching, the virtual interfaces 325, 350 may dispatch the packets again, based on the original VSNs, to the MAC/PHY layers 330, 335 or 340, 345 of one or both of links 115-c, 115-d to be re-sent. If, for example, a packet failed to transmit on link 115-c from the STA 110-b, the virtual interface 325 may dispatch the packet to the MAC/PHY layer element 335 to be re-transmitted over link 115-d. In this way, packets may be routed and re-routed seamlessly between two or more links 115-c, 115-d to increase throughput of the links in the virtual communication link to a greater degree than other link aggregation techniques.

Figure 4:
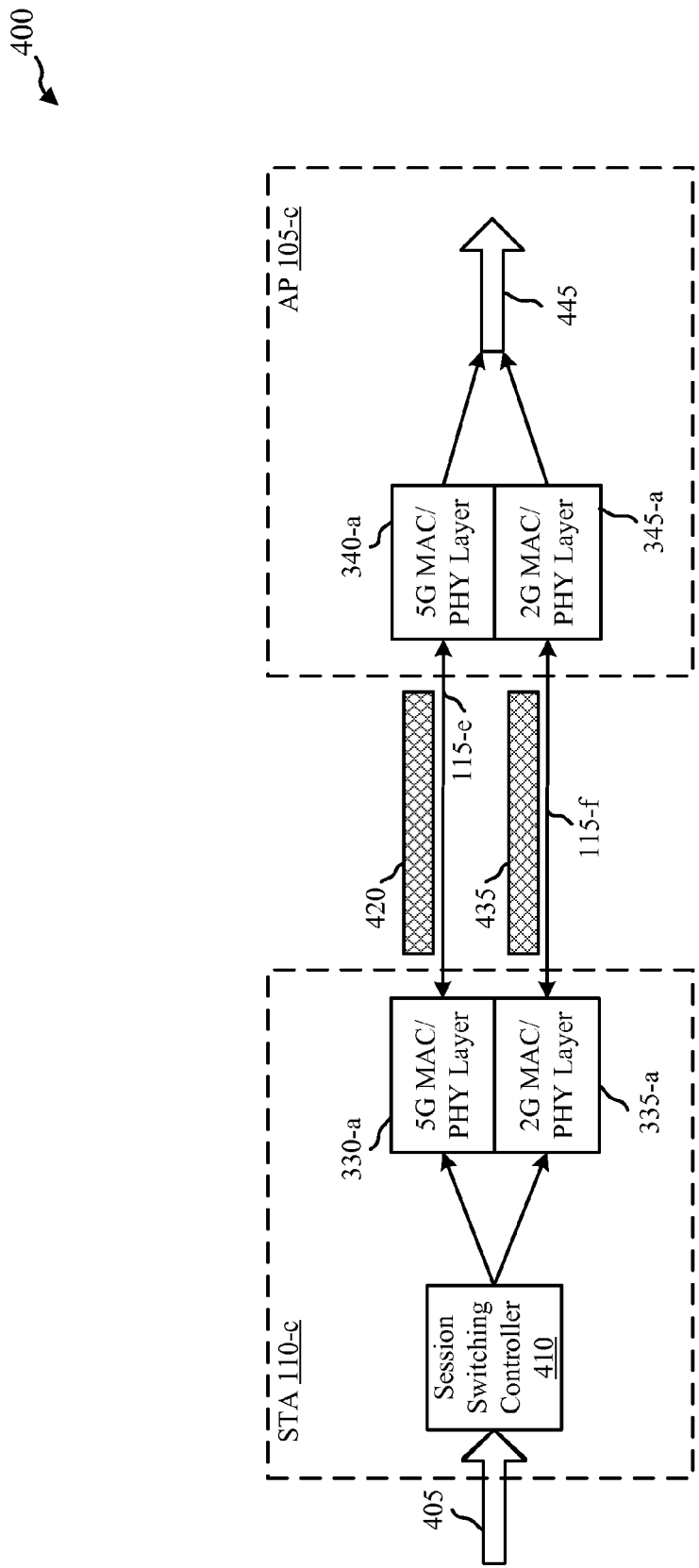
FIG. 4 shows a block diagram illustrating communication over two links utilizing session switching in accordance with various embodiments.

Referring now to FIG. 4, a block diagram 400 illustrates two devices communicating over two links 115-e, 115-f utilizing session switching in accordance with various embodiments. STA 110-c and AP 105-c may be examples of devices 110 and APs 105 described in reference to FIGS. 1, 2, and/or 3. According to this embodiment, the STA virtual interface 325 may be implemented as a session switching controller 410. Packets 405 for transmission from the STA 110-c via the virtual interface may be received at session switching controller 410 of STA 110-c, where the packets 405 can be directed to either a 5 GHz MAC/PHY layer element 330-a or a 2.4 GHz MAC/PHY layer element 335-a. The session switching controller 410 may assign TCP sessions of the packets 405 to individual links, such as session 420 to link 115-e and session 435 to link 115-f. Once a TCP session 420, 435 has been assigned to a link 115-e, 115-f, packets associated with the particular TCP session 420, 435 may be directed by the session switching controller 410 to the respective MAC/PHY layer element 330-a, 335-a to be transmitted over the correct link 115-e, 115-f.

A 5G MAC/PHY layer transceiver 340-a and a 2G MAC/PHY layer transceiver 345-a of the AP 105-c may receive communications from the STA 110-c over links 115-e, 115-f. The data communicated over links 115-e, 115-f may then be combined and sent to higher layers 445 to be used by one or more applications or programs of the AP 105-c. In some cases, the session switching controller 410 may monitor each session 420, 435 to ensure data transmitted via the sessions 420, 435 is being successfully received by the AP 105-c. In cases where, for example one link 115-e is performing better than the other link 115-f, the session switching controller may direct or redirect data associated with session 435 to be transmitted over link 115-e. In other cases, where for instance transmission over link 115-e is repeatedly unsuccessful, the session switching controller 410 may re-direct data associated with session 435 to be transmitted over link 115-e. Multiple other conditions may cause the session switching controller 410 to modify assigning data to and/or scheduling communications across over links 115-e, 115-f associated with sessions 420, 435.

By supporting multiple sessions over multiple concurrent links, a higher combined throughput of links 115-e and 115-f may be realized for communications between two devices such as STA 110-c and AP 105-c. Switching between sessions 420 and 435 may also allow STA 110-c and AP 105-c to adapt to dynamics of traffic across links 115-e an 115-f and changing link conditions. Further, session switching may also allow STA 110-c and/or AP 105-c to separate communications via the uplink and downlink to further increase the combined performance over two or more links 115-e, 115-f. In some cases, session switching may only have a small impact on the software operating on STA 110-c and/or AP 105-c and may not require any added hardware support from the STA 110-c and/or AP 105-c.

Figure 5:
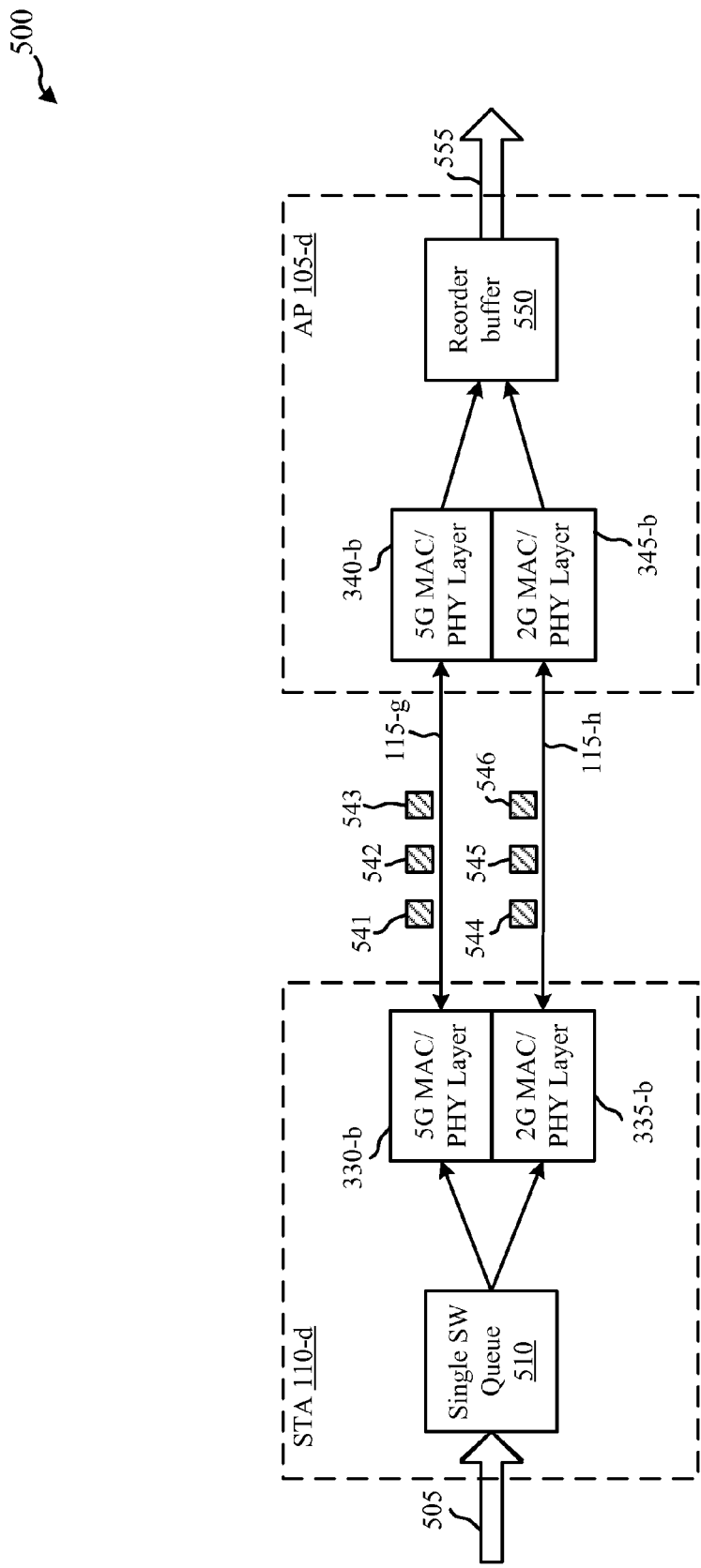
FIG. 5 shows a block diagram illustrating communication over two links utilizing packet switching in accordance with various embodiments.

Referring to FIG. 5, a block diagram 500 illustrates two devices communicating over two links 115-g, 115-h utilizing packet level switching in accordance with various embodiments. STA 110-d and AP 105-d may be examples of devices 110 and APs 105 described in reference to FIGS. 1, 2, 3, and/or 4. According to this embodiment, the STA virtual interface 325 and the AP virtual interface 350 may be implemented as a single software queue 510 and reorder buffer 550, respectively. Packets 505 for transmission from the STA 110-*d*, may be received at the single software queue 510 of STA 110-*d*. The single software queue 510 may attach VSNs to the individual packets 505 and direct the packets to one or more of a 5 GHz MAC/PHY layer element 330-*b* or a 2.4 GHz MAC/PHY layer element 335-*b* to be transmitted to the AP 105-*d*. The 5G MAC/PHY layer element 330-*b* may communicate over a first link 115-*g* and the 2G MAC/PHY layer element 335-*b* may communicate over a second link 115-*h*. The single software queue 510 may, for example, direct the packets to a particular transceiver 330-*b*, 335-*b* to be transmitted to the AP 105-*d* based on availability of links 115-*g*, 115-*h*. In this way, the link that has available capacity to transmit new packets 505, e.g., the faster link, may be allocated more packets 505. In some embodiments, the 5 GHz MAC/PHY layer transceiver 330-*b* and/or the 2.4 GHz MAC/PHY layer element 335-*b* may pull packets from the single software queue 510 if the hardware queues of the respective MAC/PHY layers 330-*b*, 335-*b* have capacity. In other embodiments, the single software queue 510 may push packets to the MAC/PHY layers 330-*b*, 335-*b* based on prior conditions of the links 115-*g*, 115-*h* and/or size and availability of space in the hardware queues of the MAC/PHY layers 330-*b*, 335-*b*. In either case, greater efficiency in link allocation and/or the overall throughput of the combined links 115-*g*, 115-*h*, e.g., the virtual communication link, may be realized.

The single software queue 510 may attach VSNs to packets 505 at the MSDU or MPDU level. For example, VSNs may be attached to MSDUs which may be passed to the MAC/PHY layers 330-*b*, 335-*b* for additional MAC layer processing (e.g., cyclic redundancy check (CRC), MAC header, aggregation, etc.). In other examples, MSDUs may be processed (e.g., CRC added, aggregated, etc.) to form MPDUs and the MPDUs with VSNs attached may be passed to the MAC/PHY layers 330-*b*, 335-*b*. However, attaching VSNs to MPDUs may be less efficient as links may have different aggregation limits.

Once the single software queue 510 has directed the packets 505 with VSNs attached to the 5G MAC/PHY layer element 330-*b* and/or the 2G MAC/PHY layer element 335-*b*, the respective MAC/PHY layers 330-*b*, 335-*b* may format the packets 505 for transmission over links 115-*g*, 115-*h*. In one embodiment, the MSDUs with VSNs attached may be aggregated at the MAC layer of the element 330-*b*, 335-*b* and a MAC header containing a MAC sequence number may be attached to the multiple MSDUs to form one or more A-MSDUs. This may be a form of MSDU aggregation. In another embodiment, a MAC header, for example including a MAC sequence number, may be attached to each MSDU to form an MPDU. VSNs may then be attached to each MPDU by the single software queue 510 and the MPDUs with VSNs may be passed to the transceivers 330-*b*, 335-*b*. The PHY layer of the element 330-*b*, 335-*b* may then aggregate the MPDUs into A-MPDUs. This may be a form of MPDU aggregation. In either embodiment, the PHY layer of the 5G element 330-*b* and/or the 2G transceiver 335-*b* may attach a PHY header to the A-MSDUs or A-MPDUs to build physical protocol data units (PPDUs) 541-546. The 5G element 330-*b* and/or the 2G element 335-*b* may then transmit the PPDUs 541-546 over links 115-*g*, 115-*h* to the AP 105-*d*. In one example, PPDUs 541, 542, and 543 may be transmitted over link 115-*g*, while PPDUs 544, 545, and 546 may be transmitted over link 115-*h*. However, it should be appreciated that the PPDUs 541-546 may be transmitted in any order and over either or both of links 115-*g*, 115-*h*. In other embodiments, the A-MSDUs and/or the A-MPDUs may be transmitted over links 115-*g*, 115-*h* without having PHY headers attached.

In either of the MSDU or MPDU aggregation techniques described above, he 5G MAC/PHY layer transceiver 340-*b* and/or the 2G MAC/PHY layer element 345-*b* of the AP 105-*d* may receive the PPDUs 541-546 over links 115-*g*, 115-*h*. The PHY and MAC headers may be removed from the PPDUs 541-546 by the 5G MAC/PHY layer transceiver 340-*b* and/or the 2G MAC/PHY layer element 345-*b* and passed to the reorder buffer 550. The reorder buffer 550 may then re-order the MSDUs or MPDUs based on the VSN of each MSDU or MPDU. The reorder buffer 550 may then strip the VSN off each of the MSDUs or MPDUs, recover the packets 505, and pass the packets 505 to higher layers 555 (e.g., TCP/IP stack, etc.) to be utilized by one or more applications or programs of the AP 105-*d*. Thus, the reorder buffer 550 may pass the packets 505 up to the higher layers 555 in the correct order, e.g., the order the packets were passed to the single software queue 510.

While the description above focuses on transmission of packets from STA 110-*d* to AP 105-*d*, the AP 105-*d* may transmit packets to the STA 110-*d* over links 115-*g* and/or 115-*h* by utilizing similar techniques as described above (e.g., attaching VSNs to MSDUs or MPDUs at a single SW queue, etc.). In this way, conditions or inequalities of links 115-*g* and 115-*h* may have much less of an impact on the throughput of the combined links 115-*g*, 115-*h*, e.g., the virtual communication link.

Figure 6:
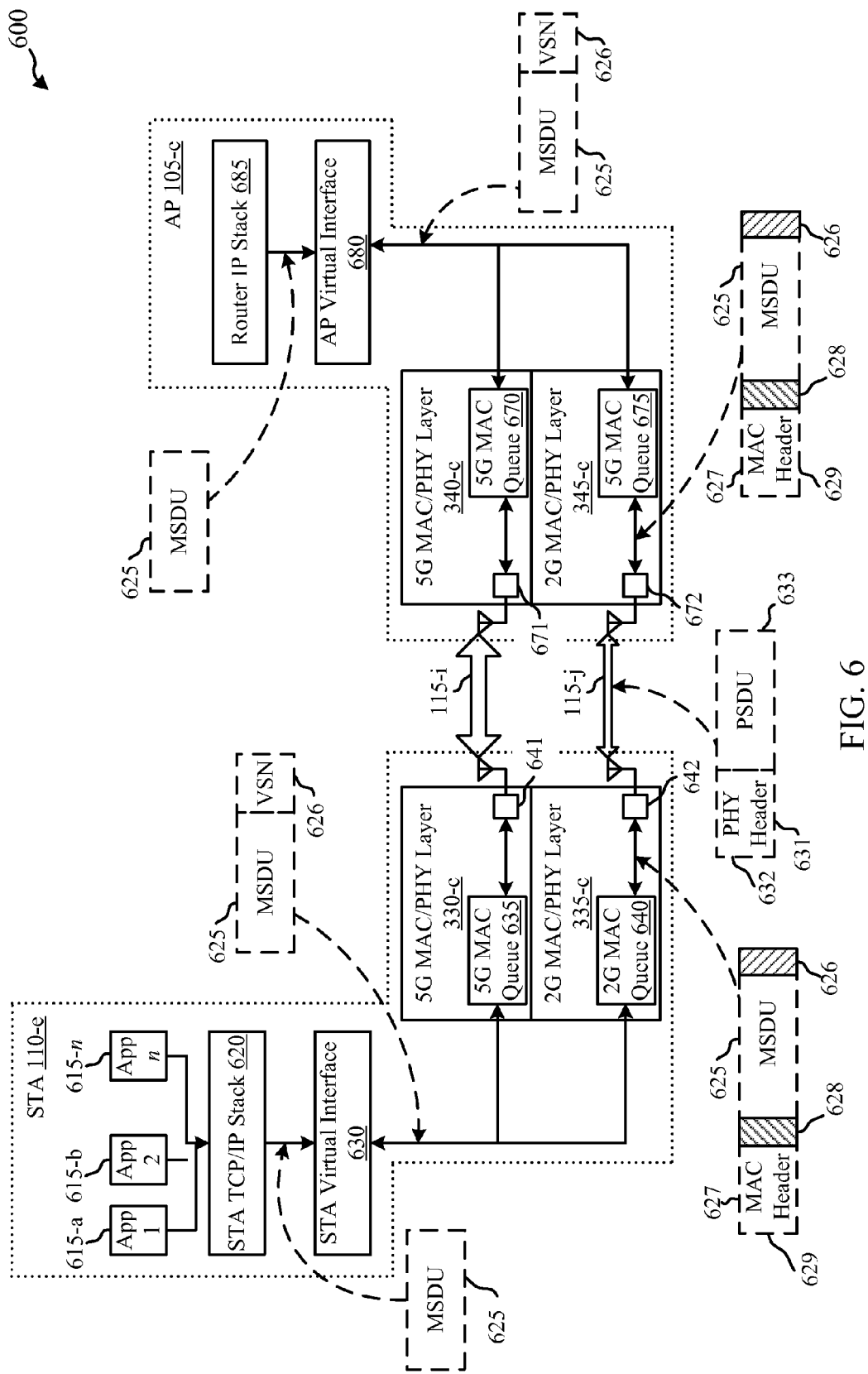
FIG. 6 shows a flow diagram of communicating data packets via a virtual communication link in accordance with various embodiments.

Referring now to FIG. 6, an STA 110-*e* may establish and communicate with an AP 105-*e* over two physical links 115-*i* and 115-*j*, for example by establishing a virtual communication link. The STA 110-*e* and the AP 105-*e* may be examples of devices 110 and APs 105 described above in reference to FIGS. 1, 2, 3, 4, and/or 5. One or more applications 615-*a* through 615-*n* may have data to send to an AP 105-*e*. The data may be passed down from the one or more applications 615-*a* through 615-*n* to an STA TCP/IP stack 620, where the data may be processed and formatted into packets, such as MSDUs 625, to be transmitted to the AP 105-*e*. The MSDUs 625 may then be communicated to an STA virtual interface 630. The STA virtual interface 630, which may include a single virtual packet queue, may attach a VSN 626 to each MSDU 625 received from the STA TCP/IP stack 620. The VSNs 626 may indicate a transmission order of the MSDUs 625 and may be attached to the end of the MSDUs 625.

The MSDUs 625 with VSNs 626 attached may then be sent from the STA virtual interface 630 to either the 5 GHZ or 2.4 GHz MAC queue 635, 640 for transmission over the primary links 115-*i*, 115-*j*. The 5 GHZ and 2.4 GHz MAC queues 635, 640 may be implemented as components (e.g., hardware queues, etc.) of the 5 GHz and 2.4 GHz MAC/PHY layers 330-*c*, 335-*c*. In some cases, for example, if certain MSDUs 625 have a high priority or have previously experienced failed transmission, the certain MSDUs 625 may be sent to both MAC queue 635, 640 to ensure more reliable communication to the AP 105-*e*. The MAC queues 635, 640 may attach a MAC header 627 including a MAC sequence number 628 to each MSDU 625 to form an MPDU 629. The MAC queues 635, 640 may perform ARQ/HARQ functions on the MPDUs 629 according to the MAC sequence numbers 628. That is, the MAC queues 635, 640 may transmit and re-transmit MPDUs 629 in order of the MAC sequence numbers 628 and the corresponding MAC queues 670, 675 may decode and reorder decoded MPDUs 629 in order of the MAC sequence numbers 628 for passing the MPDUs 629 to higher layers.

At the PHY layer of the 5 GHz and 2.4 GHz transceivers 330-c, 335-c, the MPDUs 629 are processed as physical layer protocol data units (PSDUs) 633. The 5 GHz and 2.4 GHz MAC/PHY layers 330-c, 335-c may then attach a PHY header 631 to each PSDU 633 to build one or more physical layer protocol data units (PPDUs) 632. The PPDUs may then be passed to transceivers/antennas 641, 642 of the GHz and 2.4 GHz MAC/PHY layers 330-c, 335-c to be transmitted over links 115-i and 115-j, respectively.

The AP 105-e may receive the PPDUs 632 transmitted over links 115-i and/or 115-j at transceivers/antennas 671, 672 of the MAC/PHY layers 340-c, 345-c. The PHY header 631 may be stripped off of each PPDU 632 and the remaining PSDU 633 may be forwarded to the 5G and/or 2G MAC queues 670, 675 of the MAC/PHY layers 340-c, 345-c as MPDU 629. The MAC header 627 may then be stripped off of each MPDU 629 and each MSDU 625 with VSN 626 may be separated and forwarded to the AP virtual interface 680. The AP virtual interface may reorder the MSDUs 625 according to the respective VSNs 626. The VSNs 626 may then be removed from the MSDUs 625, and the MSDUs 625 passed to the router IP stack 685 to be used by one or more applications or programs of the AP 105-e.

By these techniques, re-ordering of the MSDUs 625 at the AP 105-e may be performed via the VSNs 626 independently of the MAC sequence numbers 628 contained in the MAC header 627. In a similar manner, the AP 105-e may transmit MSDUs 625 back to the STA 110-e by attaching and utilizing VSNs 626, thus helping to reduce delays and increase throughput of the combined physical links 115-i and 115-j.

As described above, the MAC layers associated with each physical link 115-i and 115-j may perform ARQ/HARQ functions on MPDUs 629 according to the MAC sequence numbers 628. For example, if transmission of one or more PPDUs 632 fails, the associated MPDUs 629 may be re-transmitted according to the MAC sequence number 628 contained in the MAC header 627 of each MPDU 629. This re-transmission technique may be performed without interaction by the STA virtual interface 630. However, in some cases ARQ/HARQ may be unable to successfully transmit packets via one of the links due to poor link conditions or other factors.

In some embodiments, MAC queues 635, 640, 670, 675 may be configured to return MSDUs 625 back to the virtual interfaces 630, 680 of device 110-e or AP 105-e when transmission has failed (e.g., transmission is unsuccessful for a predetermined amount of time, etc.). Without attaching new VSNs 626 to the returned MSDUs 625, the virtual interfaces 630, 680 may dispatch the returned MSDUs 625 to the MAC queues 635, 640 or 670, 675 of MAC/PHY layers 330-c, 335-c or 340-c, 345-c for re-transmission over one or both of links 115-i, 115-j. If, for example, an MSDU 625 failed to transmit on link 115-i from the STA 110-e, the virtual interface 630 may receive the MSDU 625 back from 5G MAC queue 635 and may dispatch the MSDU 625 to the 2G MAC queue 640 to be re-transmitted over link 115-j. Dispatching of the returned MSDUs 625 may be according to the VSNs 626 of each MSDU 625. For example, MSDUs 625 returned from a MAC queue 635, 640, 670, 675 after failed transmission may have lower VSNs than other packets in the queue of the virtual interface and may therefore be dispatched from the queue with higher priority. In this way, MSDUs 625 may be routed and re-routed seamlessly between two or more links 115-i, 115-j with improved adaptation to link failures than other link aggregation techniques.

Aggregation may be performed at the MSDU or MPDU level. For example, the MAC queues 635, 640 may aggregate multiple MSDUs 625 to form an A-MSDU, which is then passed to the PHY layer of MAC/PHY layers 330-c, 335-c as MPDU 629. In MPDU aggregation, the PHY layer of the 5G and/or 2G MAC/PHY layers 330-c, 335-c, may perform aggregation. In this embodiment, the 5G and/or 2G MAC queues 635, 640 may attach a MAC header 627 to each MSDU 625 to create MPDUs 629. The PHY later of the 5G and/or 2G MAC/PHY layers 330-c, 335-c may then combine the multiple MPDUs 629 into an A-MPDU (not shown). A PHY header 631 may then be added to the A-MPDU to create a PPDU 632 to be transmitted via transceivers/antennas 641, 642 over links 115-i and/or 115-j. On the receiver side, the AP 105-e may receive one or more PPDUs 632 via transceivers/antennas 671, 672 and de-aggregate the MPDUs or MSDUs at the PHY layer of the 5G and/or 2G MAC/PHY layers 340-c, 345-c and the 5G and/or 2G MAC queues 670, 675. Once the A-MPDUs or A-MSDUs are de-aggregated, the AP virtual interface 680 at the receiver may re-order MSDUs according to VSNs for passing up to the router IP stack 685 to be used by one or more applications or programs of the AP 105-e.

Figure 7A:
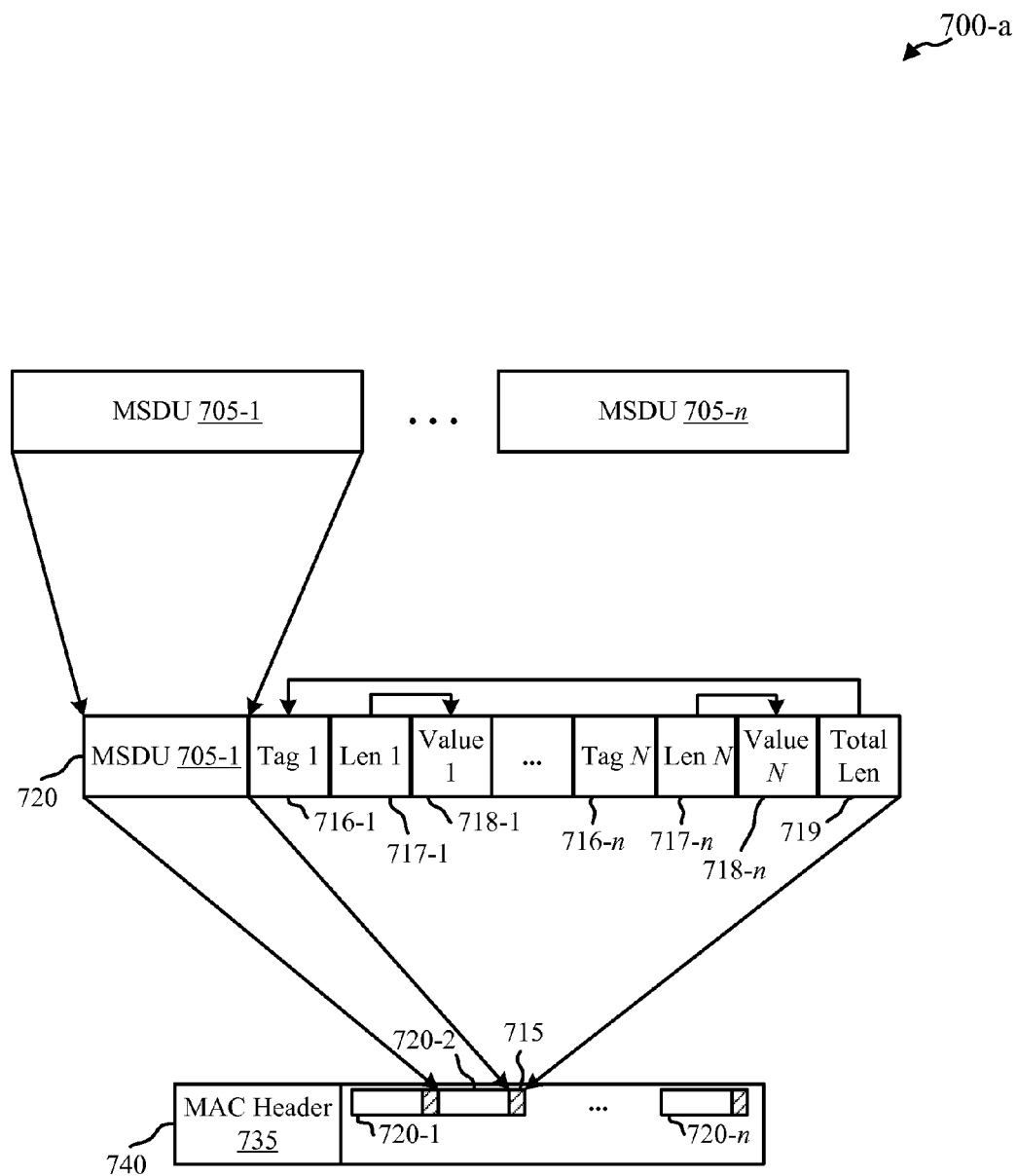
FIGS. 7A and 7B show diagrams of attaching VSNs to a plurality of data packets in accordance with various embodiments.

In reference next to FIG. 7A, a block diagram 700-a illustrates the attachment of a VSN to one or more packets such as MSDUs 705 in accordance with various embodiments. Block diagram 700-a may represent a technique for attaching VSNs 715 to multiple MSDUs 705, where the MSDUs 705 may then be aggregated according to known MSDU aggregation techniques. A number of MSDUs 705-1 through 750-n may be passed, for example, to a virtual packet queue, such as the virtual interfaces 325, 350 and/or 630, 680 described in reference to FIGS. 3 and/or 6 to be transmitted to another device 110 or AP 105. A VSN 715 may be attached to the end of each MSDU 705, such as MSDU 705-1 as shown, by the virtual queue. The VSN 715 may uniquely identify the MSDU 705-1, such that when multiple MSDUs 705 are later received by another device 110 or an AP 105, the multiple MSDUs 705 may be sorted in the order that they arrived at the virtual queue. The VSN 715 may also allow seamless retransmission (e.g., out of order) of a single MSDU 705-1, for example if the MSDU 705-1 experiences a failed transmission. As the MSDU 705-1 may be uniquely identified by the VSN 715, the MSDU 705-1 may be reordered according to the VSN 715 at the receiver. The MSDU 705-1 combined with the VSN 715 may be referred to as a virtual MSDU 720.

The VSN 715 may be implemented using a tag-length-value (TLV) structure. For example, the TLV structure may include one or more Tag fields 716-1 through 716-n, one or more Length fields 717-1 through 717-n, and one or more Value fields 718-1 through 718-n. The Tag field 716 may be one byte in size, and may be assigned to 0x01 for a link aggregation VSN. The Length field 717 may also be one byte in size, and when the Tag field 716=0x01, the Len field 717 may be equal to two. The Length field 717 may indicate the size of the Value field 718. The Value field 718 may be variable in size, and when the Tag field 716=0x01, the Value field 718 may represent the VSN of the MSDU 705-1. The TLV structure may also include a Total Length field 719, which may be one byte in size. The Total Length field 719 may indicate a total number of bytes in the TLV structure. For example, when the VSN is the only tag in the TLV, the total length may be equal to five.

In some embodiments, the TLV structure used for the VSN may be extended to support other features as well. In some cases, the TLV structure may operate or be compatible with hardware acceleration. In this way, VSNs 715 may be compatible with current hardware and may not require modifications to the hardware of existing devices 110 and APs 105.

Once one or more virtual MSDUs 720 are compiled, they may be sent to a MAC processor of one or more links 115. In some cases, the virtual queue may direct each virtual data MSDU 720 to a MAC queue, such as MAC queue 635, 640 or 670, 675 of FIG. 6, to be aggregated into one or more A-MSDUs 740. Each A-MSDU 740 may include a MAC header 735, which may include a MAC sequence number, and multiple virtual MSDUs 720-1 through 720-n. The MAC sequence numbers may be used by a transceiver of the link, such as element 330-c, 335-c, 340-c, and/or 345-c of FIG. 6 to order and send the A-MSDUs 740 over links 115. In some embodiments, the transceiver may attach an addition PHY header, such as PHY header 631 of FIG. 6, to the A-MSDU 740 to create a PPDU, such as PPDU 632 of FIG. 6. The PPDU 632 may then be transmitted over the link 115.

According to the above described techniques, each MSDU 705 may have a unique VSN 715 attached to it to allow for robust reordering of multiple MSDUs 705 at the receiver side. This may allow MSDUs 705 to be transmitted out of order and still received and recovered in the order they were received at the virtual packet queue. The unique VSN 715 may also allow for retransmission of a single MSDU 705 when, for example part of an A-MSDU 740 or PPDU 632 is not received. The ability to determine and re-transmit a single MSDU 705 may improve communication performance, for example by reducing delay in the virtual communication link when link failures occur.

Figure 7B:
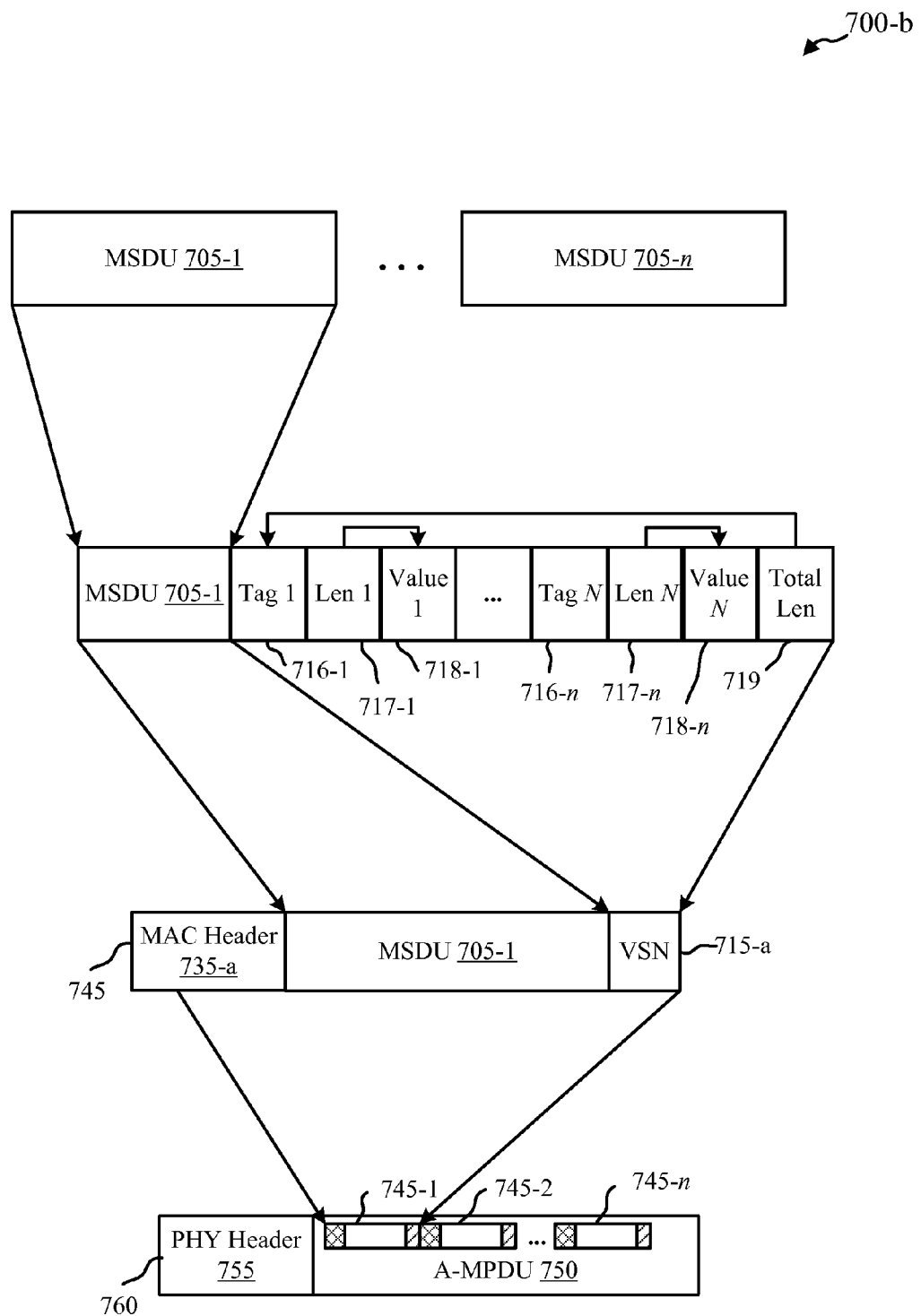

In reference next to FIG. 7B, a block diagram 700-b illustrates the attachment of a VSN to one or more packets such as MPDUs 745 in accordance with various embodiments. In this embodiment, multiple MSDUs 705-1 through 750-n may be passed to a virtual packet queue, such as the virtual interfaces 325, 350 and/or 630, 680 described in reference to FIGS. 3 and/or 6, where VSNs 715-a may be attached, as described above in reference to FIG. 7A. However, in this MPDU aggregation implementation, a MAC header 735-a may be attached to each individual MSDU 705 to form one or more MPDUs 745. The MAC header 735-a may include a MAC sequence number for the MPDU 745. In some embodiments, attaching a MAC header 735-a to each MSDU 705 with a VSN 715-a may be performed by a MAC queue, such as MAC queue 635, 640 or 670, 675 described in reference to FIG. 6. The MPDUs 745 may then be passed to the PHY layer of MAC/PHY layers 330-c, 335-c, 340-c, and/or 345-c described in reference to FIG. 6, to aggregate multiple MPDUs 745-1 through 745-n into an A-MPDU 750. In some embodiments, one or more A-MPDUs 750 may be transmitted by the PHY layer directly over a link 115. In other cases, a PHY header 755 may be attached to each A-MPDU 750 to form a PPDU 760, which may be an example of PPDU 632 described in reference to FIG. 6. One or more PPDUs 760 may then be transmitted over link 115 to another device 110 or AP 105. In this way, VSNs 715-a may be attached to multiple MPDUs 745-1 through 745-n to provide for more robust communication of data, for example, when interference or other similar conditions exist on the one or more links 115.

In this embodiment, each VSN 715-a may uniquely identify an MPDU 745, such that when multiple MPDUs 745 are later received by another device 110 or an AP 105, the multiple MPDUs 745 may be sorted in the order that they arrived at the virtual packet queue. The VSN 715-a may also allow retransmission of an MPDU 745-1, for example if the MPDU 745-1 experiences a failed transmission, because the MPDU 745-1 may be uniquely identified by the VSN 715-a. This may allow the MPDU 745-1 to be retransmitted out of order and recovered in the correct order at the receiver, such as in the order the MSDU 705-1 of the MPDU 745 was passed down to the virtual packet queue.

Figure 8:
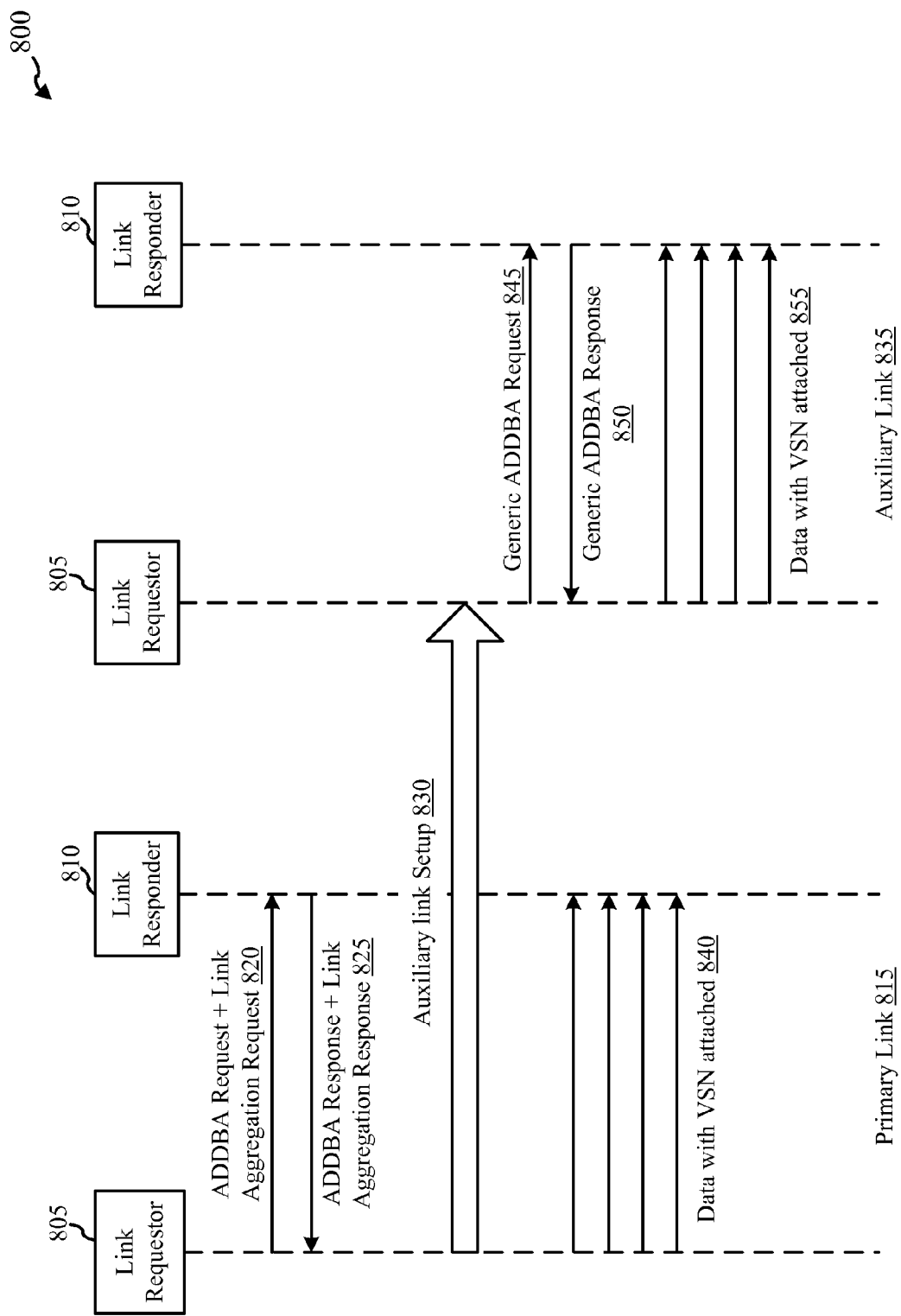
FIG. 8 shows a flow diagram for establishing and communicating packets over a virtual communication link in accordance with various embodiments.

With reference to FIG. 8, a flow diagram illustrates an example for establishing and communicating packets over a virtual communication link in accordance with various embodiments. A link requestor 805, which may be an example of an STA 110 or an AP 105 described in reference to FIGS. 1, 2, 3, 4, 5, and/or 6, may intend to establish a virtual communication link with a link responder 810, which may be an another STA 110 or an AP 105 described in reference to FIGS. 1, 2, 3, 4, 5, and/or 6. The link requestor 805 may first transmit an add block acknowledgment (AD-DBA) request with a link aggregation request 820 over a primary link 815 to the link responder 810. The primary link 815 may be an example of any of links 115 described above. The link aggregation request may be contained in a vendor specific information element (IE). The IE may be transmitted in an independent action frame, such as in the ADDBA request message or a delete block acknowledgment (DELBA) message. The link aggregation request may also contain one or more link aggregation request parameters, such as a number of auxiliary links to be used, a starting sequence number of the VSNs, and/or a buffer size (number of packets or MSDUs) of the reordering buffer of the receiver. For each auxiliary link 835, the requesting device MAC address of the link, the number of channels of the link, the bandwidth of the link, and/or the number of chains of the link may also be included in the link aggregation request.

In response to the request 820, the link responder 810 may respond by transmitting an ADDBA response with a link aggregation response 825 also over the primary link 815. The response 825 may include a vendor specific IE of one or more link aggregation response parameters of the link responder 810. The response parameters may include a result code, such as SUCCESS, REFUSE, or PARTIAL-_SUCCESS, with the latter indicating that only some of the auxiliary links have been approved. If the link setup is a success, the response parameters can also include the link responder 810 MAC address of the auxiliary link 835, the bandwidth supported by the link responder 810, and/or the number of chains supported by the link responder 810. After receiving the response 825, the link requestor 805 may initiate the auxiliary link setup 830 for auxiliary link 835.

The link requestor 805 may then send a generic ADDBA request 845 over the auxiliary link 835 to the link responder 810. The ADDBA request may indicate setup of a generic BA session using the same terminal identification (TID) as used on the primary link 815 over the auxiliary link 835. The link responder 810 may then respond by transmitting a generic ADDBA response 850 back to the link requestor 805. Once BA session setup is complete, the link aggregation session may be fully online such that data with VSNs attached may be communicated 840 over the primary link 815 and 855 over the auxiliary link 835 as described above with reference to FIGS. 2, 3, 4, 5, 6, 7A, and/or 7B.

Figure 9:
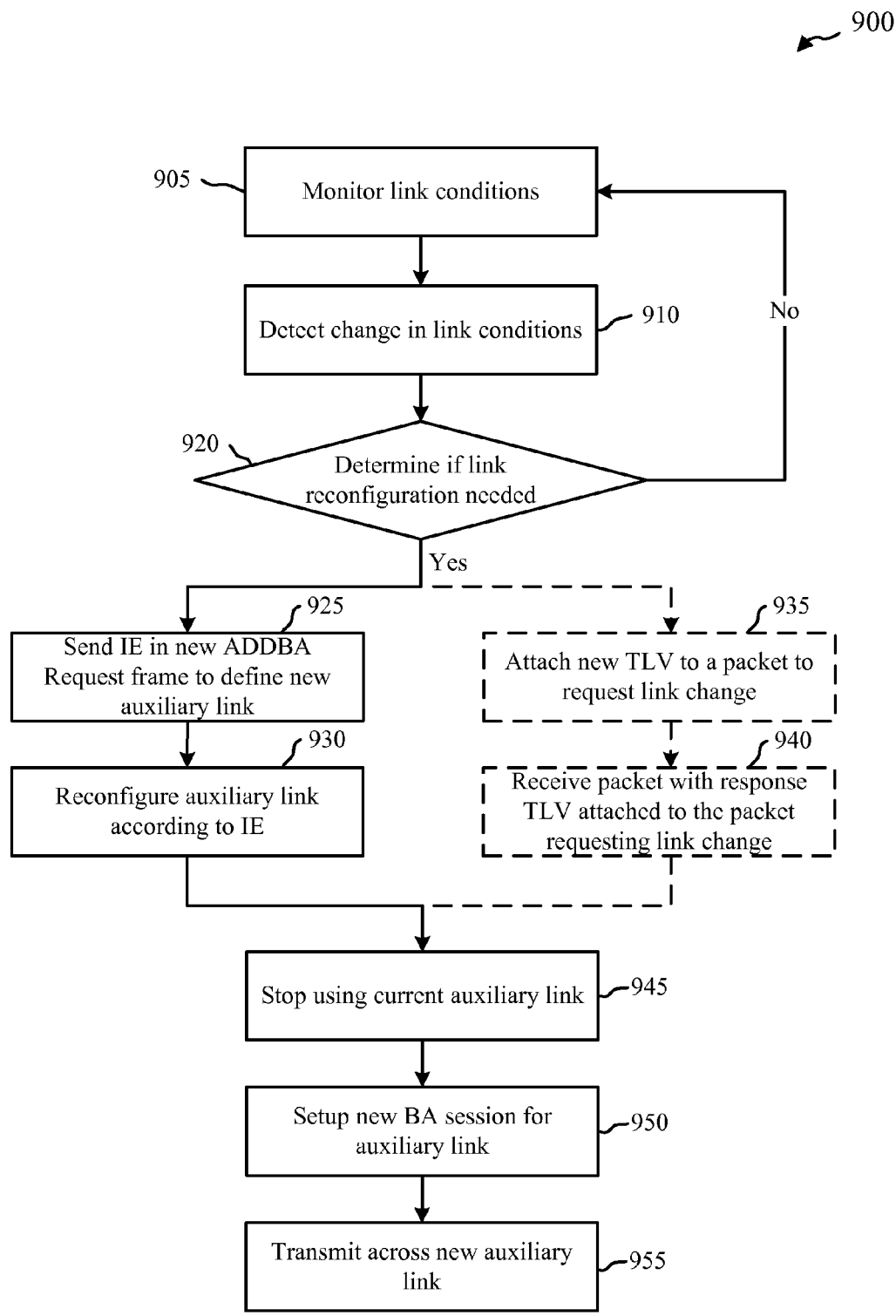
FIG. 9 shows a flow block diagram for reconfiguring a virtual communication link in accordance with various embodiments.

In reference to FIG. 9, a block flow diagram illustrates a process 900 for reconfiguring a virtual communication link in accordance with various embodiments. Process 900 may be performed, for example, by a STA 110 or an AP 105 described above in reference to FIGS. 1, 2, 3, 4, 5, and/or 6, and/or a link requestor 805 described in reference to FIG. 8. Process 900 may be performed in conjunction with techniques for establishing a virtual communication link, as described above in reference to FIGS. 2, 3, 4, 5, 6, 7A, and/or 7B.

An STA 110 (or an AP 105) may monitor link conditions at block 905 of two or more links 115 of an already established virtual communication link with, for example, an AP 105 (or STA 110). The links 105 that are monitored may be any of the links 115 described above. The STA 110 may then detect a change in link conditions at block 910. Changes in link conditions may include an increase or decrease of the throughput of a link 115, an increase or decrease in traffic on a link 115, a change in noise experienced across a link 115, failed reception/transmission over a particular link 115, etc. After detecting a change in link conditions at block 910, the STA 110 may then determine if link reconfiguration is needed at block 920. If, for example, successful communication of packets across the links is maintained through the change in link conditions, reconfiguration may not be needed, and the STA 110 may continue to monitor link conditions at block 905. If reconfiguration of one or more links is needed, the STA 110 may reconfigure one or more links 115 by sending an IE in a new ADDBA request frame containing the new configuration parameters of a link at block 925. The AP 105 may respond with its own IE containing parameters of the auxiliary link. The STA 110, in conjunction with the AP 105 may the reconfigure the auxiliary link at block 930 according to the exchanged IEs.

After reconfiguring the auxiliary link at block 930, the STA 110 and the AP 105 may stop using the current auxiliary link at block 945. The STA 110 may subsequently setup a new block acknowledgment (BA) session for the auxiliary link at block 950 and begin to transmit packets across the reconfigured auxiliary link at block 955. In some embodiments, after the auxiliary link is reconfigured at block 930, process 900 may initialize the reconfigured auxiliary link according to the procedures described above in reference to FIG. 8. In some embodiments, the current and/or reconfigured auxiliary link may be an example of the auxiliary link 835 described in reference to FIG. 8.

In some embodiments, reconfiguring the auxiliary link may include establishing a new auxiliary link, such as in replacement of the current auxiliary link or in addition to the current auxiliary link. In other embodiments, reconfiguring the auxiliary link may include changing one or more parameters of the current auxiliary link.

After determining that one or, more links of the virtual communication link need reconfiguration at block 920, the STA 110 may alternatively attach a new TLV portion to a packet to be communicated across the virtual communication link to request a link change at block 935. In some cases, the packet may be an MSDU 625, 705 or an MPDU 745 as described above in reference to FIGS. 6, 7A, and/or 7B. The TLV portion may be formatted similarly to the VSN 715 described above in reference to FIGS. 7A and/or 7B. The STA 110 may then receive a packet with a response TLV portion attached to the packet requesting a link change at block 940. This may enable the STA 110 and/or the AP 105 to reconfigure the auxiliary link. Next the STA 110 and/or AP 105 may stop using the current auxiliary link at block 945, setup a new BA session for the auxiliary link at block 950, and transmit over the new (or reconfigured) auxiliary link at block 955.

Figure 10:
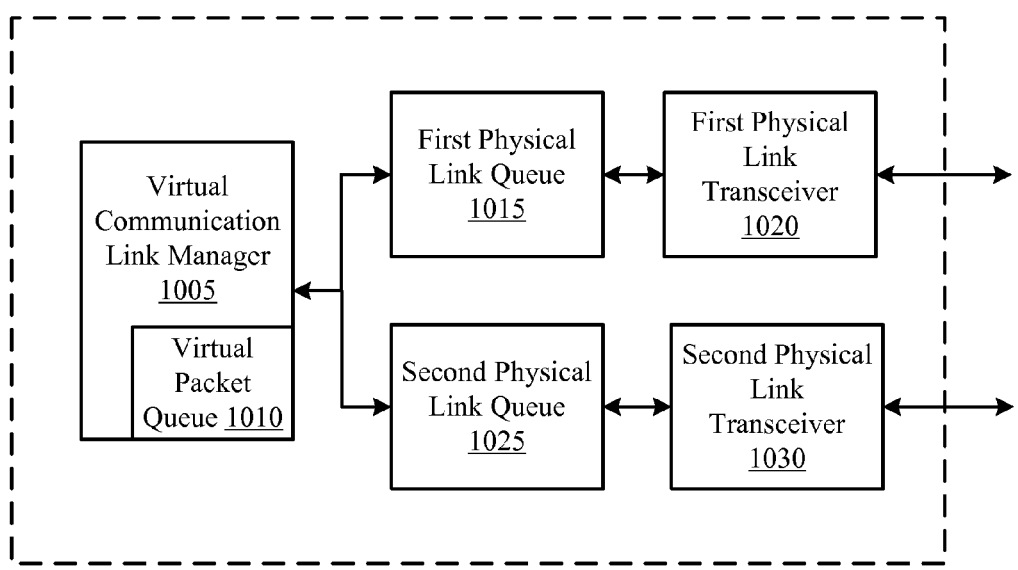
FIG. 10 is a block diagram illustrating a device for establishing and communicating over a virtual communication link in accordance with various embodiments.

FIG. 10 shows a block diagram of a device 1000 for establishing and communicating over a virtual communication in accordance with various embodiments. The device 1000 may be an example of one or more aspects of an STA 110 or AP 105 described above with reference to FIGS. 1, 2, 3, 4, 5, and/or 6, and/or a link requestor 805 or link responder 810 described in reference to FIG. 8. The device 1000 may be configured to establish and/or reconfigure a virtual communication link including multiple physical links 115 as described above in reference to FIGS. 2, 3, 4, 5, 6, 7A, 7B, 8, and/or 9. The device 1000 may include a virtual communication link manager 1005 and a virtual packet queue 1010, which may be a sub-manager of the virtual commination link manager 1005. The device 1000 may further include a first physical link queue 1015, a first physical link transceiver 1020, a second physical link queue 1025, and a second physical link transceiver 1030. Each of which, in embodiments, may be communicably coupled with any or all of the other components.

The device 1000 may transmit and receive information such as packet, data, and/or signaling information regarding what the device 1000 has received or transmitted. The received information may be utilized by the virtual communication link manager 1005 for a variety of purposes. In some cases, the first physical link transceiver 1020 and/or the second physical link transceiver 1030 may be configured to transmit and receive data, for example to/from another device 110 or AP 105, to further enable the various techniques described above for establishing and communicating over a virtual communication link.

In some embodiments, the device 1000 may be in communication with another device 110 or AP 105 over a first or primary physical link via the first physical link transceiver 1020. The other device 110 or AP 105 may be an example of the STA 110 or AP 105 described above in reference to FIGS. 1, 2, 3, 4, 5, and/or 6, and/or the link responder 810 described in reference to FIG. 8. The first or primary link may be an example of any of links 115 or 120 described above. In some cases, the primary link may be a 2.4 GHz link, such as links 115-*d*, 115-*f*, 115-*h*, and/or 115-*j*, as described in reference to FIGS. 3, 4, 5, and/or 6. The device 1000 may wish to establish a virtual communication link with the other device 110 or AP 105, for example, due to poor channel conditions over the primary link or to increase throughput of communications with the other device 110 or AP 105.

The virtual communication link manager 1005 of device 1000 may establish a virtual communication link with another device 110 by initializing the link over the first link via the first physical link transceiver 1020. The virtual communication link may be configured by the virtual communication link manager 1005 to include the first and a second physical link. The virtual communication link manager 1005 may receive one or more packets from an application or program of device 1000 to be transmitted to another device 110. The virtual communication link manager 1005 may pass the one or more packets, to the virtual packet queue 1010. The virtual communication link manager 1005 and/or the virtual packet queue 1010 may be examples of the virtual interfaces 325, 350, 630, 680 described in reference to FIGS. 3 and/or 6, the session switching controller 410 described in reference to FIG. 4, and/or the single software queue 510 and/or the reorder buffer 550 described in reference to FIG. 5.

The virtual packet queue 1010 may attach a VSN to each of the one or more data packets received from the virtual communication link manager 1005. The virtual packet queue 1010 may then direct or send the one or more packets with VSNs to one or more of the first or second physical link transceiver 1020, 1030. The first and/or second physical link transceivers 1020, 1030 may be examples of aspects of MAC/PHY layers 330, 335, 340, and/or 345 described in reference to FIGS. 3, 4, 5, and/or 6.

In some embodiments, the one or more data packets may first be sent to a first physical link queue 1015 and/or a second physical link queue 1025 before being passed to the first and/or second physical link transceivers 1020, 1030. The first physical link queue 1015 and/or a second physical link queue 1025 may be examples of the MAC queues 635, 640, 670, and/or 675 described in reference to FIG. 6. The first physical link queue 1015 and/or a second physical link queue 1025 may assign link specific sequence numbers, such as MAC sequence numbers, to the one or more packets for purposes of sending the packets across the first and/or second physical links of the virtual communication link. The first and/or second physical link queues 1015, 1025, may then pass the one or more packets to the first and/or second physical link transceivers 1020, 1030 to be transmitted over the first and/or second physical links according to the MAC sequence numbers attached to each packet.

In some embodiments, the one or more data packets may be an example of MSDUs 625, 705 or MPDUs 745 as described above in reference to FIGS. 6, 7A, and/or 7B. The VSNs attached by the virtual packet queue 1010 may be an example of VSNs 626 and/or 715 as described in reference to FIGS. 6, 7A, and/or 7B.

Figure 11:
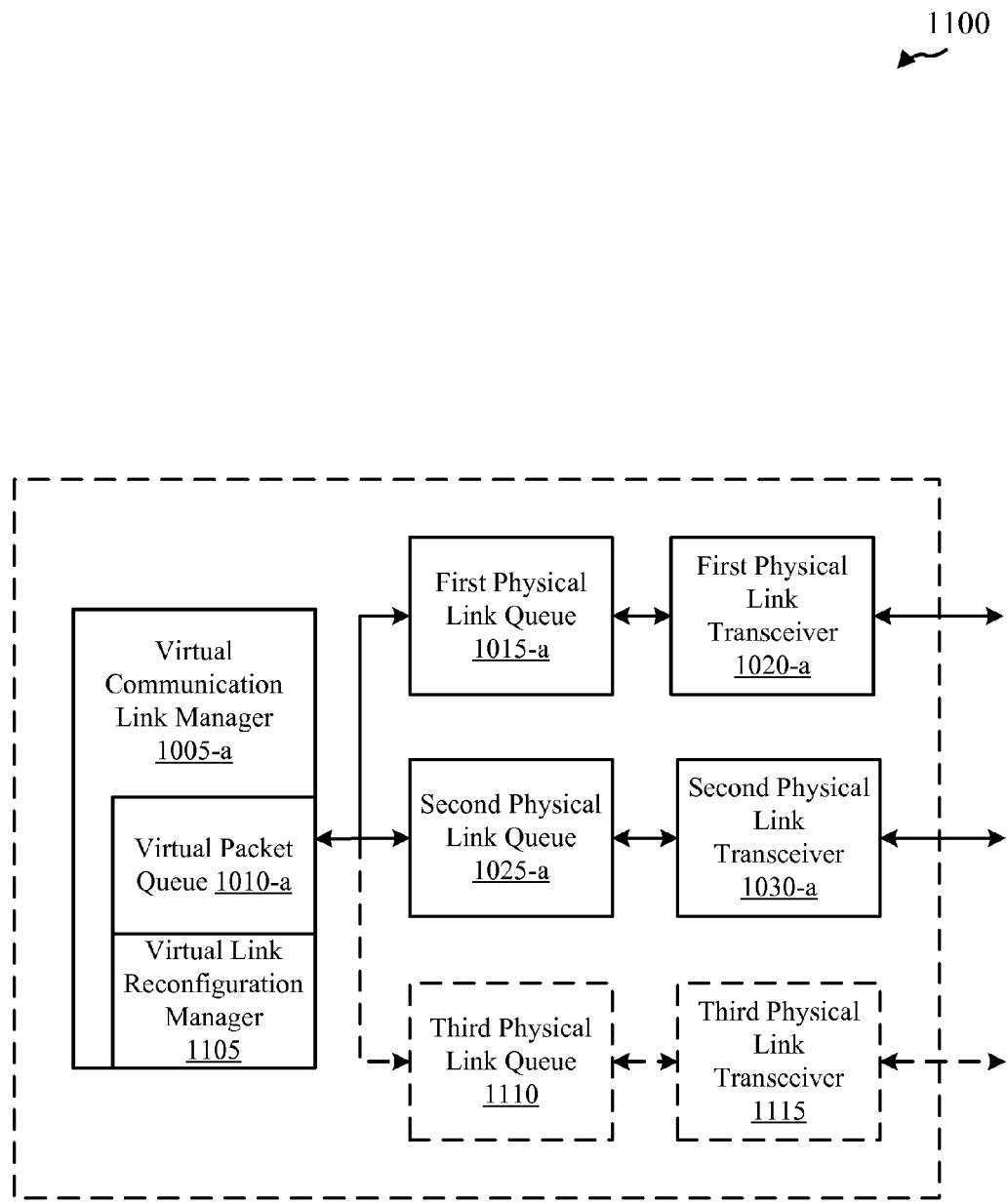
FIG. 11 is a block diagram illustrating another example of a device for establishing and communicating over a virtual communication link in accordance with various embodiments.

FIG. 11 shows a block diagram of a device 1100 for establishing, communicating over, and/or reconfiguring a virtual communication in accordance with various embodiments. The device 1100 may be an example of one or more aspects of an STA 110 or AP 105 described above with reference to FIGS. 1, 2, 3, 4, 5, and/or 6, a link requestor 805 or link responder 810 described in reference to FIG. 8, and/or device 1000 described in reference to FIG. 10. Many aspects of device 1100 may be similar to aspect of device 1000 of FIG. 10 and for the sake of brevity, will not be repeated here. The device 1100 may be configured to establish and/or reconfigure a virtual communication link including multiple physical links 115 as described above in reference to FIGS. 2, 3, 4, 5, 6, 7A, 7B, 8, and/or 9. The device 1100 may include a virtual communication link manager 1005-*a*, a virtual packet queue 1010-*a*, which may be a sub-component of the virtual commination link manager 1005-*a*, and a virtual link reconfiguration manager 1105, which may also be a sub-component of the virtual communication link manager 1005-*a*. The device 1100 may further include a first physical link queue 1015, a first physical link transceiver 1020, a second physical link queue 1025, a second physical link transceiver 1030. In some embodiments, the device also includes a third physical link queue 1110 and a third physical link transceiver 1115. Each of the components of device 1100, in embodiments, may be communicably coupled with any or all of the other components.

The device 1100 may transmit and receive information such as packet, data, and/or signaling information regarding what the device 1100 has received or transmitted. The received information may be utilized by the virtual communication link manager 1005-*a* for a variety of purposes. In some cases, the first physical link transceiver 1020, the second physical link transceiver 1030, and/or the third physical link transceiver 1115 may be configured to transmit and receive data, for example to/from another device 110 or AP 105, to further enable the various techniques described above for establishing, communicating over, and/or reconfiguring a virtual communication link.

In some embodiment, the device 1100 may be in communication with another device 110 or AP 105 over a first or primary physical link via the first physical link transceiver 1020. The other device 110 or AP 105 may be an example of the STA 110 or AP 105 described above in reference to FIGS. 1, 2, 3, 4, 5, and/or 6, and/or the link responder 810 described in reference to FIG. 8. The first or primary link may be an example of any of links 115 or 120 described above. In some cases, the primary link may be a 2.4 GHz link, such as links 115-*d*, 115-*f*, 115-*h*, and/or 115-*j*, as described in reference to FIGS. 3, 4, 5, and/or 6. The device 1100 may wish to establish a virtual communication link with the other device 110 or AP 105, for example, due to poor channel conditions over the primary link or to increase throughput of communications with the other device 110 or AP 105.

The virtual communication link manager 1005-*a* of device 1100 may establish a virtual communication link with another device 110 utilizing the first and second physical link queues 1015-*a*, 1025-*a* and the first and second physical link transceivers 1020-*a*, 1030-*a* as described above in reference to FIG. 10.

In some embodiments, the virtual communication link manager 1005-*a* may configure the virtual communication link to include a third physical link, which may be an example of links 115 or 120 described above. The virtual packet queue 1010-*a* may receive one or more packets from the virtual communication link manager 1005-*a* and attach VSNs to each of the packets. The virtual packet queue 1010-*a* may then direct the packets to one or more of the first, second or third physical link transceivers 1020-*a*, 1030-*a*, and/or 1115 to be transmitted over the first, second, and/or third links to another device 110 or AP 105. In some cases, the packets may first be directed to one or more of the first, second, or third physical link queues 1015-*a*, 1025-*a*, or 1110, where link specific sequence numbers (e.g., MAC sequence numbers) can be assigned to each of the packets. The packets may then be passed to the transceivers 1020-*a*, 1030-*a*, and/or 1115 to be transmitted over the first, second, and/or third links according to the MAC sequence numbers.

In some embodiments, for example when the second link fails to successfully delivery packets for a given amount of time, the virtual link reconfiguration manager 1105 and/or the virtual communication link manager 1005-*a* may initialize a third link via the third physical link transceiver 1115. The third link may be initialized via process 900 described in reference to FIG. 9. After the third link is initialized, the virtual packet queue 1010-*a* may direct one or more packets to the third physical link queue 1110, where MAC sequence numbers may be attached to each of the packets. The packets may then be passed to the third physical link transceiver 1115 to be transmitted over the third physical link according to the MAC sequence number of each packet. In some embodiments, the third physical link may replace the second physical link in the virtual commination link. In other embodiments, the third physical link may be added to the first and second physical links in the virtual communication link.

Figure 12:
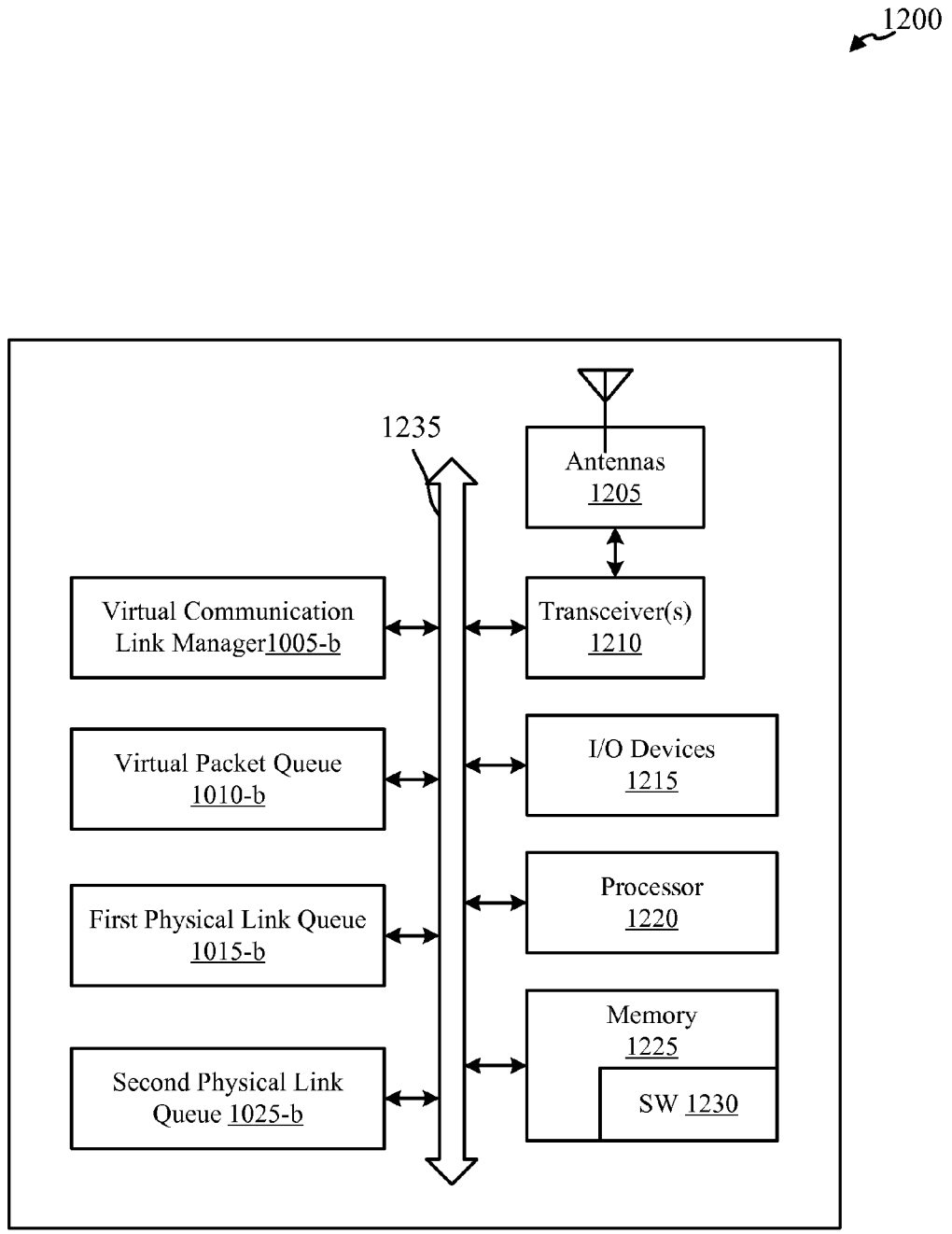
FIG. 12 shows a block diagram of a device that may be configured for establishing and communicating over a virtual communication link in accordance with various embodiments.

FIG. 12 is a block diagram of a device 1200 configured for establishing, communicating over, and/or reconfiguring a virtual communication link including multiple physical links in accordance with various embodiments. Device 1200 may be an example of one or more aspects of a device 110 and/or AP 105 described with reference to FIGS. 1, 2, 3, 4, 5, and/or 6, link requestor 805 or link responder 810 described in reference to FIG. 8, and/or devices 1000 and/or 1100 described with reference to FIGS. 10 and/or 11. The device 1200 may have any of various configurations, such as personal computers (e.g., laptop computers, netbook computers, tablet computers, etc.), smartphones, cellular telephones, PDAs, wearable computing devices, digital video recorders (DVRs), internet appliances, routers, gaming consoles, e-readers, display devices, printers, etc. The device 1200 may have an internal power supply (not shown), such as a small battery, to facilitate mobile operation.

The device 1200 includes antenna(s) 1205, transceiver(s) 1210, memory 1225, a processor 1220, and I/O devices 1215, which each may be in communication, directly or indirectly, with each other, for example, via one or more buses 1235. The transceiver(s) 1210 may be configured to communicate bi-directionally, via the antennas 1205 with one or more wired or wireless links, such as any of links 115, 120, 815, and/or 835 described above in reference to FIGS. 1, 2, 3, 4, 5, 6 and/or 8. The transceiver(s) 1210 may include a modem configured to modulate the packets and provide the modulated packets to the antennas 1205 for transmission, and to demodulate packets received from the antennas 1205. The transceiver(s) 1210 may, in conjunction with the antennas 1205, transmit and receive packets, such as MSDUs 625, 705, A-MSDUs 740, MPDUs 629, 745, A-MPDUs 750, and/or PPDUs 632, 760 described in reference to FIGS. 6, 7A, and/or 7B. The transceiver(s) 1210 may be configured to maintain multiple concurrent communication links using the same or different radio interfaces (e.g., Wi-Fi, cellular, etc.). The device 1200 may include a single antenna 1205, or the device 1200 may include multiple antennas 1205. The device 1200 may be capable of employing multiple antennas 1205 for transmitting and receiving communications in a multiple-input multiple-output (MIMO) communication system.

The memory 1225 may include random access memory (RAM) and read-only memory (ROM). The memory 1225 may store computer-readable, computer-executable software code 1230 containing instructions that are configured to, when executed, cause the processor 1220 to perform various functions described herein. Alternatively, the software 1230 may not be directly executable by the processor 1220 but may be configured to cause the computer (e.g., when compiled and executed) to perform functions described herein. The processor 1220 may include an intelligent hardware device, e.g., a central processing unit (CPU), a microcontroller, an application specific integrated circuit (ASIC), etc.

According to the architecture of FIG. 12, the device 1200 may further include a virtual communication link manager 1005-b, a virtual packet queue 1010-b, a first physical link queue 1015-b, and a second physical link queue 1025-b. By way of example, these modules may be components of the device 1200 in communication with some or all of the other components of the device 1200 via bus 1235. Additionally or alternatively, functionality of these components may be implemented via the transceiver 1210, as a computer program product stored in software 1230, and/or as one or more controller elements of the processor 1220. In some embodiments, the virtual communication link manager 1005-b, virtual packet queue 1010-b, and/or first and/or second physical link queue 1015-b, 1025-b may be implemented as subroutines in memory 1225/software 1230, executed by the processor 1220. In other cases, these modules may be implemented as sub-modules in the processor 1220 itself.

The virtual communication manager 1005-b may, in conjunction with the virtual packet queue 1010-b, the transceiver(s) 1210, and antennas 1205, establish a virtual communication link with another device 110 or AP 105. The virtual packet queue 1010-b may direct one or more packets to be transmitted across the virtual communication link to a first and/or second physical link queue 1015-b, 1025-b, where MAC sequence numbers or other hardware ARQ/HARQ sequence numbers may be attached to each packet. The first and second physical link queues 1015-b, 1025-b may then direct the packets to the transceiver 1210 to be transmitted across a first and second link making up the virtual communication link according to the MAC sequence numbers. The transceiver(s) 1210 may then direct the packets to antennas 1205 to be transmitted. The components of device 1200 may further implement the procedures described above for establishing, communicating over, and reconfiguring a virtual communication link, and for the sake of brevity, will not be repeated here.

Figure 13:
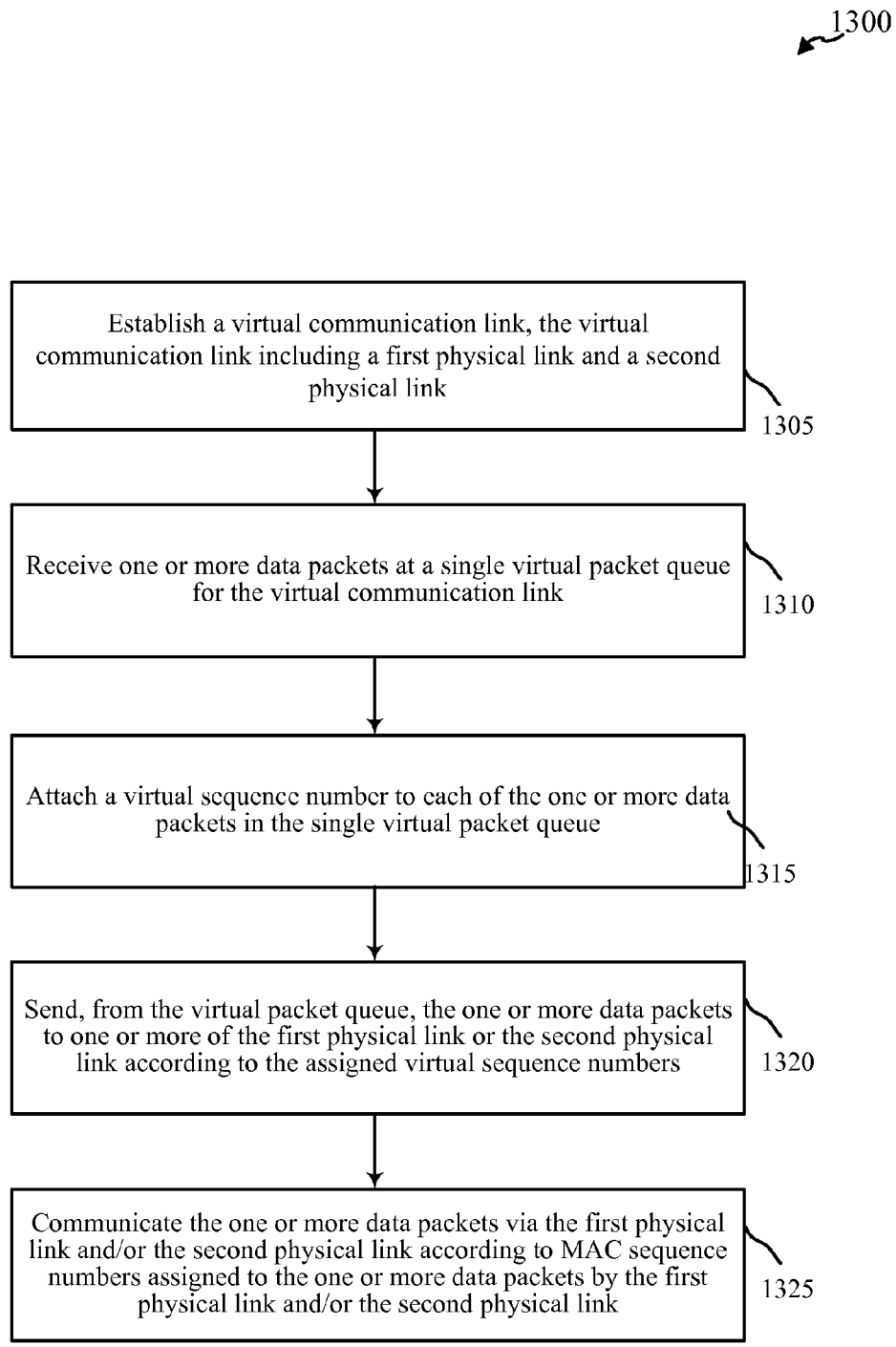
FIGS. 13 and 14 illustrate flowcharts of methods for establishing and communicating over a virtual communication link that includes two or more physical links in accordance with various embodiments.

FIG. 13 is a flow chart illustrating one example of a method 1300 for establishing and communicating over a virtual communication link in accordance with various embodiments. For clarity, the method 1300 is described below with reference to one or more aspects of a device 110 or an AP 105 described with reference to FIGS. 1, 2, 3, 4, 5, and/or 6, a link requestor 805 or a link responder 810 described with reference to FIG. 8, and/or device 1000 and/or 1100 described with reference to FIGS. 10 and/or 11. In some embodiments, a device such as one of the devices 110 may execute one or more sets of codes to control the functional elements of the device 110 to perform the functions described below.

At block 1305, a device 110 may establish a virtual communication link, including a first physical link and a second physical link, with another device 110 or an AP 105. transceiver.

At block 1310, one or more data packets may be received at a single virtual packet queue of the device 110 for the virtual communication link. In some implementations, the one or more data packets may include one or more MSDUs. At block 1315, the virtual packet queue may attach a VSN to each of the one or more data packets.

At block 1320, the virtual packet queue of the device 110 may send the one or more data packets to one or more of the first physical link or the second physical link according to the assigned virtual sequence numbers.

At block 1325, the device 110 may communicate the one or more data packets via the first physical link and/or the second physical link according to link specific sequence numbers, such as MAC sequence numbers, assigned to the one or more data packets by the first physical link and/or the second physical link. The first physical link may be in the 2.4 GHz band link and the second physical link may be in the 5 GHz band link. In some embodiments, communicating the one or more data packets via the virtual communication link may be performed in a single communication session.

In some embodiments, method 1300 may be performed by any of devices 1000, 1100, or 1200 as described above in reference to FIGS. 10, 11, and 12. For example, the virtual communication link manager 1005 may in conjunction with the first and second physical link queue 1015, 1025 and the first and second physical link transceiver 1020, 1030 or the transceiver 1210 and antennas 1205 establish a virtual communication link including the first and second physical links with another device 110 or an AP 105. The virtual communication link manager 1005 may pass one or more packets to the virtual packet queue 1010, where VSNs can be attached to each of the packets. The virtual packet queue 1010 may then direct the packets to one or more of the first or second physical link queues 1015, 1025, where MAC sequence numbers may be attached to each of the packets. The packets may then be passed to the transceivers 1020, 1030 for transmission over the first and second links in the virtual communication link.

Thus, the method 1300 may provide for establishing and communicating over a virtual communication link including two or more physical links. It should be noted that the method 1300 is just one implementation and that the operations of the method 1300 may be rearranged or otherwise modified such that other embodiments are possible.

Figure 14:
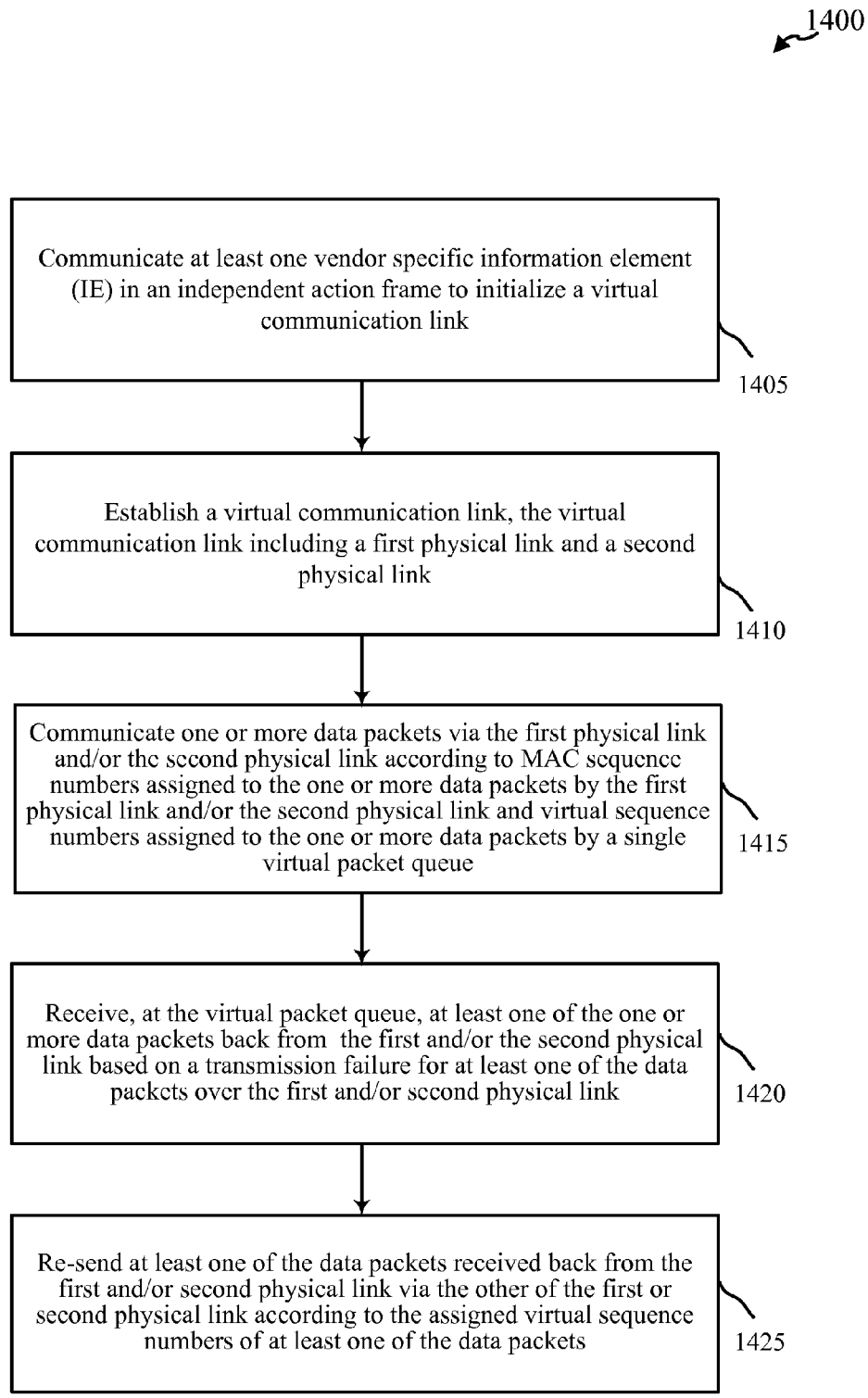

FIG. 14 is a flow chart illustrating one example of another method 1400 for establishing and communicating over a virtual communication link in accordance with various embodiments. For clarity, the method 1400 is described below with reference to one or more aspects of a device 110 or an AP 105 described with reference to FIGS. 1, 2, 3, 4, 5, and/or 6, a link requestor 805 or a link responder 810 described with reference to FIG. 8, and/or device 1000 and/or 1100 described with reference to FIGS. 10 and/or 11. In some embodiments, a device such as one of the devices 110 may execute one or more sets of codes to control the functional elements of the device 110 to perform the functions described below.

At block 1405, a device 110 may communicate at least one vendor specific information element (IE) in an independent action frame to initialize a virtual communication link with another device 110 or an AP 105.

At block 1410, a device 110 may establish a virtual communication link, including a first physical link and a second physical link, with another device 110 or AP 105.

At block 1415, the device 110 may communicate one or more data packets via the first physical link and/or the second physical link. ARQ/HARQ may be performed by the first physical link and second physical link according to link specific sequence numbers, such as MAC sequence numbers, for example, assigned to the one or more data packets by the physical links while packet flow and re-ordering at the virtual communication interface may be performed according to virtual sequence numbers assigned to the one or more data packets by a single virtual packet queue.

At block 1420, the virtual packet queue of device 110 may receive at least one of the one or more data packets back from the first and/or the second physical links based on a transmission failure for at least one of the data packets over the first and/or second physical links.

At block 1425, the device 110 may re-send at least one of the data packets received back from the first and/or second physical link via the other of the first or second physical link according to the assigned virtual sequence numbers of at least one of the data packets.

In some embodiments, method 1400 may be performed by any of devices 1000, 1100, or 1200 as described above in reference to FIGS. 10, 11, and 12. For example, a virtual communication link may be established and one or packets may be communicated according to VSNs over a first and/or second physical link by the virtual communication link manager 1005, the virtual packet queue 1010, and the respective link queues 1015, 1025 and transceivers 1020, 1030. One or more packets that experienced failed transmission/reception may be received back at the virtual packet queue 1010. The virtual packet queue 1010 may then direct the received packets to the other of the first or second physical link queues 1015, 1025 to be re-transmitted via transceivers 1020, 1030. In some cases, method 1400 may also be performed over a virtual communication link that includes a third physical link in a similar manner, as described above in reference to FIG. 11.

Thus, the method 1400 may provide for establishing and communicating over a virtual communication link including two or more physical links. It should be noted that the method 1400 is just one implementation and that the operations of the method 1400 may be rearranged or otherwise modified such that other embodiments are possible. One or more aspects of the method 1300 and/or 1400 may in some cases be omitted or combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication comprising:
   establishing a virtual communication link comprising a first physical link and a second physical link different from the first physical link, the establishing comprising communicating at least one vendor specific information element (IE) in an independent action frame, wherein the at least one vendor specific IE comprises at least one of a link aggregation request parameter or a link aggregation response parameter,
   wherein the link aggregation request parameter comprises at least one from the group consisting of a number of auxiliary links, a virtual sequence number starting sequence number, a buffer size, a requesting device's MAC address of at least one of the first physical link or the second physical link, a channel number of the at least one of the first physical link or the second physical link, a bandwidth of the at least one of the first physical link or the second physical link, and a number of chains of the at least one of the first physical link or the second physical link, and
   wherein the link aggregation response parameter comprises at least one from the group consisting of a plurality of result codes, a receiver reordering buffer size, a responding device's MAC address of the at least one of the first physical link or the second physical link, a bandwidth supported by the responding device, and a number of chains in the at least one of the first physical link or the second physical link supported by the responding device;
   attaching a virtual sequence number to a data packet for each data packet in a virtual packet queue for the virtual communication link;
   for each data packet in the virtual packet queue:
     sending, from the virtual packet queue, the data packet to one of a first physical link interface or a second physical link interface according to the attached virtual sequence number; and
     assigning, by the one of the first physical link interface or the second physical link interface, a link specific sequence number to the data packet, wherein the data packet is communicated via the corresponding one of the first physical link or the second physical link according to the link specific sequence number;
   receiving, at the virtual packet queue, the data packet from the one of the first physical link interface or the second physical link interface based on a transmission failure for the data packet and
   re-sending the data packet after the data packet is received from the one of the first physical link interface or the second physical link interface via the other of the first physical link interface or the second physical link interface according to the attached virtual sequence number of the data packet.

2. The method of claim 1, wherein the link specific sequence number comprises a medium access control (MAC) sequence number assigned to the data packet by the one of the first physical link interface or the second physical link interface, the method further comprising:
   transmitting the data packet over the corresponding one of the first physical link or the second physical link according to the MAC sequence number assigned to the data packet by the one of the first physical link interface or the second physical link interface.

3. The method of claim 1, wherein the independent action frame comprises one of an add block acknowledgment (ADDBA) frame or a delete block acknowledgment (DELBA) frame.

4. The method of claim 1, further comprising communicating a plurality of data packets including the data packet, wherein communicating the plurality of data packets is performed in a single communication session.

5. The method of claim 1, wherein the first physical link comprises a 2.4 GHz band link and the second physical link comprises a 5 GHz band link.

6. The method of claim 1, further comprising:
re-configuring the virtual communication link to include a third physical link; and
communicating the data packet via the re-configured virtual communication link using the virtual sequence number already assigned to the data packet.

7. The method of claim 1, further comprising:
re-configuring the virtual communication link by at least one of communicating at least one vendor specific reconfiguration IE in a second independent action frame or attaching an auxiliary request parameter to the data packet.

8. A wireless communication device, comprising:
a processor; and
a memory in electronic communication with the processor, the memory embodying instructions, the instruction being executable by the processor to cause the device to:
establish a virtual communication link comprising a first physical link and a second physical link different from the first physical link, the establishing comprising communicating at least one vendor specific information element (IE) in an independent action frame, wherein the at least one vendor specific IE comprises at least one of a link aggregation request parameter or a link aggregation response parameter,
wherein the link aggregation request parameter comprises at least one from the group consisting of a number of auxiliary links, a virtual sequence number starting sequence number, a buffer size, a requesting device's MAC address of at least one of the first physical link or the second physical link, a channel number of the at least one of the first physical link or the second physical link, a bandwidth of the at least one of the first physical link or the second physical link, and a number of chains of the at least one of the first physical link or the second physical link, and
wherein the link aggregation response parameter comprises at least one from the group consisting of a plurality of result codes, a receiver reordering buffer size, a responding device's MAC address of the at least one of the first physical link or the second physical link, a bandwidth supported by the responding device, and a number of chains in the at least one of the first physical link or the second physical link supported by the responding device;
attach a virtual sequence number to a data packet for each data packet in a virtual packet queue for the virtual communication link;
for each data packet in the virtual packet queue;
send from the virtual packet queue, the data packet to one of a first physical link interface or a second physical link interface according to the attached virtual sequence number; and
assign, by the one of the first physical link interface or the second physical link interface, a link specific sequence number to the data packet, wherein the data packet is communicated via the corresponding one of the first physical link or the second physical link according to the link specific sequence number;
receive, at the virtual packet queue, the data packet from the one of the first physical link interface or the second physical link interface based on a transmission failure for the data packet; and
re-send the data packet after the data packet is received from the one of the first physical link interface or the second physical link interface via the other of the first physical link interface or the second physical link interface according to the attached virtual sequence number of the data packet.

9. The device of claim 8, wherein the link specific sequence number comprises a medium access control (MAC) sequence number assigned to the data packet by the one of the first physical link interface or the second physical link interface.

10. The device of claim 8, wherein the instruction are further executable by the processor to cause the device to:
communicate a plurality of data packets including the data packet in a single communication session.

11. The device of claim 8, wherein the instruction are further executable by the processor to cause the device to:
re-configure the virtual communication link to include a third physical link; and
communicate the data packet via the re-configured virtual communication link using the virtual sequence number already assigned to the data packet.

12. The device of claim 8, wherein the instruction are further executable by the processor to cause the device to:
re-configure the virtual communication link by at least one of communicating at least one vendor specific reconfiguration IE in a second independent action frame, or attaching an auxiliary request parameter to the data packet.

13. A wireless communication device comprising:
means for establishing a virtual communication link comprising a first physical link and a second physical link different from the first physical link, the means for establishing communicating at least one vendor specific information element (IE) in an independent action frame, wherein the at least one vendor specific IE comprises at least one of a link aggregation request parameter or a link aggregation response parameter,
wherein the link aggregation request parameter comprises at least one from the group consisting of a number of auxiliary links, a virtual sequence number starting sequence number, a buffer size, a requesting device's MAC address of at least one of the first physical link or the second physical link, a channel number of the at least one of the first physical link or the second physical link, a bandwidth of the at least one of the first physical link or the second physical link, and a number of chains of the at least one of the first physical link or the second physical link, and
wherein the link aggregation response parameter comprises at least one from the group consisting of a plurality of result codes, a receiver reordering buffer size, a responding device's MAC address of the at least one of the first physical link or the second physical link, a bandwidth supported by the responding device, and a number of chains in the at least one of the first physical link or the second physical link supported by the responding device;

means for sending each data packet in a virtual packet queue for the virtual communication link to one of a first physical link interface or a second physical link interface according to an attached virtual sequence number associated with each data packet in the virtual packet queue;

means for assigning, for each data packet, a link specific sequence number by the one of the first physical link interface or the second physical link interface to the data packet, wherein the data packet is communicated via the corresponding one of the first physical link or the second physical link according to the link specific sequence number; and means for receiving, at the virtual packet queue, the data packet from the one of the first physical link interface or the second physical link interface based on a transmission failure for the data packet, wherein the means for sending re-sends the data packet after the data packet is received from the one of the first physical link interface or the second physical link interface, wherein re-sending is via the other of the first physical link interface or the second physical link interface according to the attached virtual sequence number of the data packet.

14. The device of claim 13, wherein the link specific sequence number comprises a medium access control (MAC) sequence number assigned to the data packet by the one of the first physical link interface or the second physical link interface, the device further comprising:

means for communicating the data packet via the one of the first physical link or the second physical link according to the MAC sequence number assigned to the data packet by the one of the first physical link interface or the second physical link interface.

15. The device of claim 13, further comprising:
means for communicating the data packet via the virtual communication link in a single communication session.

16. The device of claim 13, further comprising:
means for re-configuring the virtual communication link to include a third physical link; and
means for communicating the data packet to communicate the data packet via the re-configured virtual communication link using the virtual sequence number already assigned to the data packet.

17. The device of claim 13, further comprising:
means for re-configuring the virtual communication link by at least one of communicating at least one vendor specific reconfiguration IE in a second independent action frame, or attaching an auxiliary request parameter to the data packet.

18. A non-transitory computer-readable medium for a wireless communication device, the non-transitory computer-readable medium storing instructions for:

establishing a virtual communication link comprising a first physical link and a second physical link different from the first physical link, the establishing comprising communicating at least one vendor specific information element (IE) in an independent action frame, wherein the at least one vendor specific IE comprises at least one of a link aggregation request parameter or a link aggregation response parameter, wherein the link aggregation request parameter comprises at least one from the group consisting of a number of auxiliary links, a virtual sequence number starting sequence number, a buffer size, a requesting device's MAC address of at least one of the first physical link or the second physical link, a channel number of the at least one of the first physical link or the second physical link, a bandwidth of the at least one of the first physical link or the second physical link, and a number of chains of the at least one of the first physical link or the second physical link, and wherein the link aggregation response parameter comprises at least one from the group consisting of a plurality of result codes, a receiver reordering buffer size, a responding device's MAC address of the at least one of the first physical link or the second physical link, a bandwidth supported by the responding device, and a number of chains in the at least one of the first physical link or the second physical link supported by the responding device;

attaching a virtual sequence number to a data packet for each data packet in a virtual packet queue for the virtual communication link;

for each data packet in the virtual packet queue;
sending, from the virtual packet queue, the data packet to one of a first physical link interface or a second physical link interface according to the attached virtual sequence number; and
assigning by the one of the first physical link interface or the second physical link interface, a link specific sequence number to the data packet, wherein the data packet is communicated via the corresponding one of the first physical link or the second physical link according to the link specific sequence number;

receiving, at the virtual packet queue, the data packet back from the one of the first physical link interface or the second physical link interface based on a transmission failure for the data packet over the corresponding one of the first physical link or the second physical link; and re-sending the data packet received from the one of the first physical link interface or the second physical link interface via the other of the first physical link interface or the second physical link interface according to the attached virtual sequence number of the data packet.

19. The non-transitory computer program product of claim 18, wherein the link specific sequence number comprises a medium access control (MAC) sequence number assigned to the data packet by the one of the first physical link interface or the second physical link interface, and wherein the non-transitory computer-readable medium further stores instructions for:

communicating the data packet via the corresponding one of the first physical link or the second physical link according to the MAC sequence number assigned to the data packet by the one of the first physical link interface or the second physical link interface.

* * * * *